United States Patent
Matsuo

(10) Patent No.: US 8,731,196 B2
(45) Date of Patent: May 20, 2014

(54) DECRYPTING APPARATUS, ENCRYPTING APPARATUS, DECRYPTING METHOD, ENCRYPTING METHOD, AND COMMUNICATION SYSTEM

(75) Inventor: Masakatsu Matsuo, Fukuoka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/502,081

(22) PCT Filed: Jul. 23, 2010

(86) PCT No.: PCT/JP2010/004712
§ 371 (c)(1),
(2), (4) Date: Apr. 13, 2012

(87) PCT Pub. No.: WO2011/067876
PCT Pub. Date: Jun. 9, 2011

(65) Prior Publication Data
US 2012/0201383 A1    Aug. 9, 2012

(30) Foreign Application Priority Data

Dec. 4, 2009    (JP) ................................. 2009-276294

(51) Int. Cl.
*H04K 1/00*    (2006.01)
(52) U.S. Cl.
USPC ............................. 380/255; 380/276; 455/355
(58) Field of Classification Search
None
See application file for complete search history.

(56) References Cited

U.S. PATENT DOCUMENTS

| | | | |
|---|---|---|---|
| 6,256,391 B1 | 7/2001 | Ishiguro | |
| 6,460,137 B1 | 10/2002 | Akiyama | |
| 7,233,665 B1 | 6/2007 | Ishiguro | |
| 7,242,769 B2 | 7/2007 | Ishiguro | |
| 7,298,842 B2 | 11/2007 | Ishiguro | |
| 7,860,248 B2 | 12/2010 | Ishiguro | |
| 8,170,206 B2 | 5/2012 | Ishiguro | |
| 8,594,325 B2 | 11/2013 | Ishiguro | |
| 2002/0025045 A1* | 2/2002 | Raike | ............................ 380/280 |
| 2002/0094081 A1* | 7/2002 | Medvinsky | ..................... 380/44 |
| 2003/0191956 A1 | 10/2003 | Ishiguro | |
| 2006/0140402 A1 | 6/2006 | Ishiguro | |
| 2007/0140484 A1 | 6/2007 | Ishiguro | |
| 2008/0013723 A1 | 1/2008 | Ishiguro | |

(Continued)

FOREIGN PATENT DOCUMENTS

| | | |
|---|---|---|
| JP | 8-335040 | 12/1996 |
| JP | 10-301492 | 11/1998 |
| JP | 2007-033649 | 2/2007 |

(Continued)

OTHER PUBLICATIONS

International Search Report dated Oct. 19, 2012.

*Primary Examiner* — Philip Chea
*Assistant Examiner* — Khoi Le
(74) *Attorney, Agent, or Firm* — Dickinson Wright PLLC

(57) ABSTRACT

A decrypting apparatus for decrypting cryptography data included in a packet includes a receiver, a key generator, and a decrypting section. The receiver receives a packet transmitted from an encrypting apparatus that executes an encrypting process. The key generator generates a key used for the encrypting process. The decrypting section decrypts cryptography data included in the packet received by the receiver with using the key generated by the key generator. In the decrypting apparatus, the packet received by the receiver includes packet information used for generating the key. The key generator generates the key with using the packet information.

21 Claims, 17 Drawing Sheets

(56) References Cited

U.S. PATENT DOCUMENTS

| | | |
|---|---|---|
| 2009/0196421 A1* | 8/2009 | Okuda .......................... 380/270 |
| 2010/0290619 A1 | 11/2010 | Ishiguro |
| 2010/0303229 A1* | 12/2010 | Unruh ............................ 380/28 |
| 2012/0257744 A1 | 10/2012 | Ishiguro |
| 2013/0236009 A1 | 9/2013 | Ishiguro |

FOREIGN PATENT DOCUMENTS

| | | |
|---|---|---|
| JP | 2008-60817 | 3/2008 |
| JP | 2009-81564 | 4/2009 |
| WO | 99/12310 | 3/1999 |
| WO | 01/86860 | 11/2001 |
| WO | 02/17655 | 2/2002 |

* cited by examiner

DECRYPTING APPARATUS, ENCRYPTING APPARATUS, DECRYPTING METHOD, ENCRYPTING METHOD, AND COMMUNICATION SYSTEM

TECHNICAL FIELD

The present invention relates to a decrypting apparatus, an encrypting apparatus, a decrypting method, an encrypting method, and a communication system that can repress a synchronization gap between a transmitting side and a receiving side even in a communication system where a packet loss and a reverse arrival order of packets may occur.

BACKGROUND ART

The Internet has recently been utilized for various communications. E-mail and Web as non-real-time communication were mainly used when the Internet started spreading. According to advances in Internet technology, however, real-time communication in sound and image systems, such as a television, a telephone, and a monitoring camera, is recently used a lot in the Internet.

Since Quality of Service (QoS) is not taken into consideration in the Internet, the Internet is not suitable for the real-time communication. Therefore, the Internet is demanded to have a high communication speed in order to improve a real-time characteristic of communication via the Internet. For such a demand, for example, Patent Literature 1 discloses a cryptosystem, such as a streaming encryption, to improve the communication speed while maintaining security.

The number of users and a transmission data capacity abruptly increase (for example, high definition in image communication), and thus, the increasing of the communication speed of the Internet does not necessarily improve the real-time characteristic. From such a background, the real-time communication employs not the Transmission Control Protocol (TCP) communication having a low communication speed but the User Datagram Protocol (UDP) communication having a high speed.

However, the UDP communication may cause a packet loss and a reverse arrival order of packets, hence requiring a particular technique for a common key cryptosystem. For example, in an AES CBC mode of Arcfour encryption and block encryption of streaming encryption which are often utilized in the common key cryptosystem of the SSL cryptographic communication (TCP communication), the packet loss and the reversed arrival order of packets may cause a synchronization gap, and may prevent the receiving side from performing proper decryption from the time the packet loss and the reversed arrival order of packets occur.

CITATION LIST

Patent Literature

[PTL 1]
Unexamined Japanese Patent Publication No. 2007-33649

SUMMARY OF INVENTION

A decrypting apparatus decrypts cryptography data included in a packet. The decrypting apparatus includes a receiver for receiving a packet transmitted from an encrypting apparatus that executes an encrypting process, a key generator for generating a key used for the encrypting process, and a decrypting section for decrypting the cryptography data included in the packet received by the receiver. The packet received by the receiver includes packet information used for generating the key. The key generator generates the key with the packet information.

An encrypting apparatus encrypts plaintext data and transmits cryptography data to a decrypting apparatus. The encrypting apparatus includes a key generator for generating a key with using packet information corresponding to a packet, an encrypting section for encrypting plaintext data with using on the key generated by the key generator to generate cryptography data, and a transmitter for transmitting the packet including the cryptography data and the packet information to the decrypting apparatus.

The decrypting apparatus receives the packet information used for generating the key and the plaintext data encrypted by using the key both in a single packet, hence utilizing information which is necessary for generating the key also for decryption of the cryptography data. As a result, even when packet loss and a change in an order of the packets occur during the transmission of the packets, the apparatuses prevent a synchronization gap between the encrypting apparatus and the decrypting apparatus.

The encrypting apparatus transmits the packet information used for generating the key and the plaintext data encrypted by using the key both in a single packet to the decrypting apparatus. For this reason, even when the packet loss and the change in the order of packets occur during the transmission of the packets, the decrypting apparatus can receive information necessary for generating the key used in the decrypting process to decrypt the cryptography data.

DESCRIPTION OF EMBODIMENTS

Figure 1:
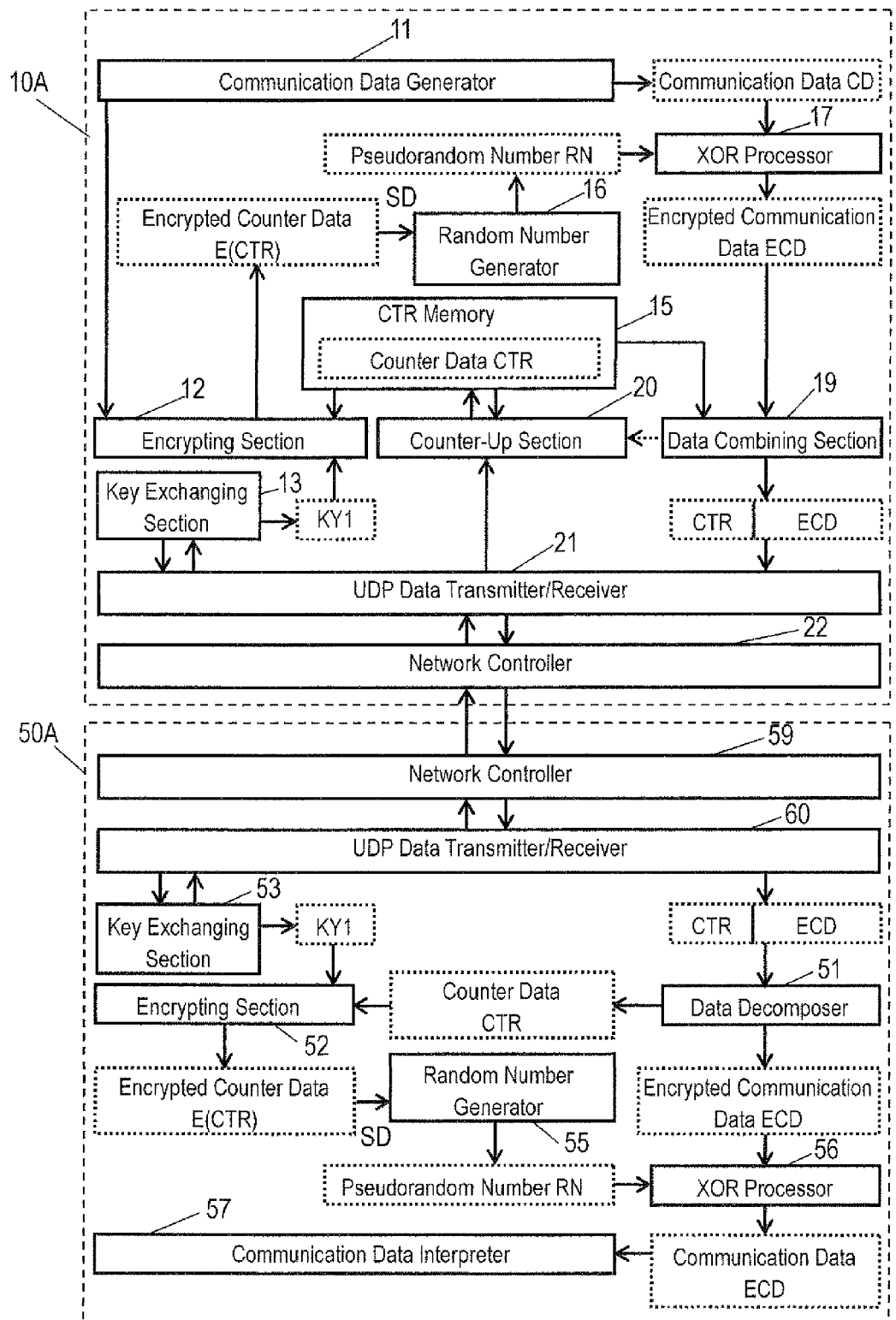
FIG. 1 is a functional block diagram of a communication system according to Exemplary Embodiment 1 of the present invention.

A decrypting apparatus according to an embodiment decrypts cryptography data included in a packet. The decrypting apparatus includes a receiver for receiving a packet transmitted from an encrypting apparatus that executes an encrypting process, a key generator for generating a key used for the encrypting process, and a decrypting section for decrypting cryptography data included in the packet received by the receiver. The packet received by the receiver includes packet information used for generating the key. The key generator generates the key with using the packet information. As a result, the decrypting apparatus receives the packet information used for generating the key and plaintext data encrypted by using this key in a single packet, hence utilizing information which is necessary for generating the key also for decrypting the cryptography data. As a result, even when packets are lost and an order of the packets is changed during transmission of the packets, the apparatuses prevent a synchronization gap between the encrypting apparatus and the decrypting apparatus.

An encrypting apparatus according to the embodiment encrypts plaintext data and transmits cryptography data to a decrypting apparatus. The encrypting apparatus includes a key generator for generating a key with using packet information corresponding to a packet, an encrypting section for encrypting plaintext data with using the key generated by the key generator to generate cryptography data, and a transmitter for transmitting a packet including the cryptography data and the packet information to a decrypting apparatus. As a result, the encrypting apparatus transmits the packet information used for generating the key and the plaintext data encrypted by using the key in a single packet to the decrypting apparatus. For this reason, even when packets are lost and an order of the packets is changed during transmission of the packets, the decrypting apparatus can receive information necessary for generating the key used in the decrypting process to decrypt the cryptography data.

A decrypting method according to the embodiment for decrypting cryptography data included in a packet includes a receiving step of receiving a packet transmitted from an encrypting apparatus that executes an encrypting process, a key generating step of generating a key used for the encrypting process, and a decrypting step of decrypting cryptography data included in the packet, received at the receiving step, with using the key generated at the key generating step. The packet received at the receiving step includes packet information used for generating the key. The key is generated at the key generating step with using the packet information. As a result, in the decrypting method, since the packet information used for generating the key and the plaintext data encrypted by using this key are received in a single packet, information necessary for generating the key can be used for decrypting the cryptography data. As a result, even when packets are lost and an order of the packets is changed during transmission of the packets, this method prevents a synchronization gap between the encrypting apparatus and the decrypting apparatus.

An encrypting method according to the embodiment for decrypting plaintext data and transmitting cryptography data to a decrypting apparatus includes a key generating step of generating a key with using packet information corresponding to a packet, an encrypting step of encrypting plaintext data with using the key generated at the key generating step to generate cryptography data, and a transmitting step of transmitting the packet including the cryptography data and the packet information to the decrypting apparatus. As a result, in the encrypting method, the packet information used for generating the key and the plaintext data encrypted by using this key are transmitted in a single packet to the decrypting apparatus. For this reason, even when packets are lost and an order of the packets is changed during the transmission of the packets, the decrypting apparatus can receive information which is necessary for generating the key in the decrypting process for decrypting the cryptography data.

A communication method according to the embodiment includes an encrypting apparatus for encrypting plaintext data and transmitting cryptography data included in a packet to a communication line, and a decrypting apparatus for receiving the packet from the encrypting apparatus via the communication line and decrypting the cryptography data included in the packet. The encrypting apparatus includes a first key generator for generating a key with using packet information corresponding to a packet, an encrypting section for encrypting plaintext data with using the key generated by the first key generator and generating cryptography data, and a transmitter for transmitting a packet including the cryptography data and the packet information to the decrypting apparatus. The decrypting apparatus includes a receiver for receiving a packet transmitted from the encrypting apparatus, a second key generator for generating a key with using packet information included in the packet received by the receiver, and a decrypting section for decrypting cryptography data, included in the packet received by the receiver, with using the key generated by the second key generator. As a result, since the encrypting apparatus transmits the packet information used for generating the key and the plaintext data encrypted by using this key in a single packet to the decrypting apparatus, the decrypting apparatus can receive information which is necessary for generating the key in the decrypting process for decrypting the cryptography data. Since the decrypting apparatus receives the packet information used for generating the key and the plaintext data encrypted by using this key in a single packet, the information used for generating the key can be used as information for decrypting the cryptography data. As a result, even when packets are lost and an order of the packets is changed during the transmission of the packets, the system prevents a synchronization gap between the encrypting apparatus and the decrypting apparatus.

Embodiment 1

A communication system shown in FIG. 1 includes transmitter 10A and receiver 50A. Transmitter 10A and receiver 50A are examples of the encrypting apparatus and the decrypting apparatus, respectively. Transmitter 10A and receiver 50A can be connected via a communication path, such as the Internet. The communication path may be any of wired and wireless paths. According to this embodiment, a connectionless type protocol, such as the User Datagram Protocol (UDP) is used as a communication protocol. A connection type protocol, such as the Transmission Control Protocol (TCP) can be used as the communication protocol.

Transmitter 10A includes communication data generator 11, encrypting section 12, key exchanging section 13, CTR memory 15, random number generator 16, XOR processor 17, data combining section 19, counter-up section 20, UDP data transmitter/receiver 21, and network controller 22. Transmitter 10A includes an integrated circuit, such as a CPU or an ASIC. Functional blocks shown in FIG. 1 are implemented by, e.g. the CPU.

Receiver 50A includes data decomposer 51, encrypting section 52, key exchanging section 53, random number generator 55, XOR processor 56, communication data interpreter 57, UDP data transmitter/receiver 60, and network controller 59. Receiver 50A includes an integrated circuit, such as a CPU or an ASIC, similarly to transmitter 10A. The functional blocks shown in FIG. 1 are implemented by, e.g. the CPU.

Random number generator 16 generates pseudorandom numbers with using a common key. XOR processor 17 encrypts plaintext data for each bit of the plaintext data. That is, random number generator 16 and XOR processor 17 constitute a functional block for performing a streaming encryption. Random number generator 55 generates pseudorandom numbers with using a common key similarly to random number generator 16. XOR processor 56 decrypts encrypted data for each bit of the encrypted data. That is, random number generator 55 and XOR processor 56 constitute a functional block for performing the streaming encryption. According to this embodiment, the pseudorandom numbers are used as random numbers. But another type of random numbers, such as true random numbers, may be used as long as the random numbers are determined uniquely according to the value of a seed.

The streaming encryption is a common key cryptosystem, and is a cryptosystem for successively encrypting a plaintext for each bit or each byte of the plaintext. The streaming encryption, a common key cryptosystem, allows an encrypting side (random number generator 16 and XOR processor 17) and a decrypting side (random number generator 55 and XOR processor 56) to be implemented by equivalent calculating sections. The encrypting side and the decrypting side are implemented by the same calculating sections according to this embodiment. The streaming encryption can utilize Arcfour, but is not limited to this. The streaming encryption can utilize a method utilizing block encryption, such as a Cipher Block Chaining (CBC) mode. Since a processing speed of a dedicated streaming encryption, such as Arcfour, is higher than that of Advanced Encryption Standard (AES) encryption representing a block encryption in a software process, the dedicated encryption is suitable for a high-speed UDP communication. The sound/image communication requires the real-time characteristic as described above, preferably utilizes the dedicated streaming encryption, such as Arcfour, in order to prevent jitter of voice communication and jitter of visual communication. According to this embodiment, Arcfour is used as the streaming encryption.

Encrypting section 12 is a block encrypting section that can adopt a counter mode. According to Embodiment 1, the AES encryption is employed. The block encryption is a common key cryptosystem, and a cryptosystem for processing a plaintext in each blocks. The block unit may be a fixed length or a variable length. The block encryption can be AES or 3DES (Data Encryption Standard). Since the block encryption is a common key cryptosystem, encrypting sections 12 and 52 are calculating sections equivalent to each other. According to this embodiment encrypting sections 12 and 52 are the same calculating sections. Therefore, common keys KY1 to be input to encrypting sections 12 and 52 have the same value. The block encryption is a cryptosystem having an inverse function. The cryptosystem having the inverse function is a system that does not convert different plaintexts into the same encrypted data.

The counter mode is a process for encrypting counter data so as to use the numerical values of the encrypted data as the pseudorandom numbers. The counter data are numbers for identifying packets. The counter data here are serial numbers of packets. In the case that the counter data are the serial numbers, the same counter data do not appear, thus improving security.

The counter data is packet information. The packet information is information corresponding to packets PK1, . . . , PKn-1, and PKn in the case that the transmitter transmits the first packet PK1, . . . , the (N−1)-th packet PKn-1, and the N-th packet PKn (N and n are not smaller than two) to the receiver. The packet information is information for identifying the packets PK1, . . . , PKn-1, and PKn. Therefore, the packet information is not necessarily the counter data. For example, if certain data that can be used as the counter data exists in the UDP packet, the certain data can be used instead of the counter data. For example, in the case that sound data is communicated, if a data format of the sound data includes a serial number, the serial number may be used as the counter data.

An operation of transmitter 10A will be described below. At first, in transmitter 10A, key exchanging section 13 generates key KY1, and sets key KY1 to encrypting section 12. Encrypting section 12 encrypts key KY1 with using a public key of a public key cryptosystem, and transmits the encrypted key to UDP data transmitter/receiver 21. UDP data transmitter/receiver 21 transmits the encrypted key KY1 to receiver 50A via network controller 22. In receiver 50A, UDP data transmitter/receiver 60 receives the encrypted key KY1 via network controller 59.

Key exchanging section 53 receives the encrypted key from UDP data transmitter/receiver 60. Key exchanging section 53 decrypts the encrypted key KY1 with a secret key of the public key cryptosystem paired with the public key. Key exchanging section 53 acquires key KY1 generated by transmitter 10A, and sets key KY1 to encrypting section 52. The keys are exchanged by using such an ordinary public key cryptosystem, however, actually, a lot of precautions should be exercised since the keys are not attacked in the encryption like the Secure Sockets Layer (SSL) communication. However, in order to simplify the description of the present invention, the key exchange is described briefly. The keys are exchanged in the UDP packet, but the keys may be exchanged by TCP communication, such as the SSL communication. Alternatively, the common key may be set manually. Any other methods may be used as the method for exchanging a common key.

Upon key KY1 being set, communication data generator 11 generates communication data CD as plaintext data, and transmits it to XOR processor 17. Simultaneously to this, communication data generator 11 notifies encrypting section 12 of the start of the encrypting process. The notifying of the start of the encrypting process may be performed by XOR processor 17.

Encrypting section 12 reads current counter data CTR from CTR memory 15 storing counter data CTR therein. Encrypting section 12 encrypts counter data CTR to generate encrypted counter data E(CTR). Encrypting section 12 sets encrypted counter data E (CTR) as a seed SD of random number generator 16, namely, a common key of the streaming encryption. This operation allows random number generator 16 to generate pseudorandom numbers that are safe cryptographically (namely, unpredictable pseudorandom numbers). An initial value of counter data CTR may be any value.

Then, encrypting section 12 requests random number generator 16 to generate a pseudorandom number. This request may be performed by communication data generator 11 or XOR processor 17. Random number generator 16 generates pseudorandom number RN that is equal to or larger than a data length of communication data CD, and transmits pseudorandom number RN to XOR processor 17.

XOR processor 17 calculates the exclusive OR (XOR) between each bit of the communication data CD and each bit of pseudorandom number RN (namely, encrypts communication data CD) so as to generate encrypted communication data ECD. In the following description, the calculation of exclusive OR is referred to simply as "XOR operation". XOR processor 17 transmits encrypted communication data ECD to data combining section 19. The XOR operation on communication data CD and pseudorandom number RN is performed once, but it may be performed successively to each bit.

Data combining section 19 adds counter data CTR read from CTR memory 15 to encrypted communication data ECD, and generates encrypted communication data ECD associated with counter data CTR. Data combining section 19 transmits the generated data to UDP data transmitter/receiver 21.

Data combining section 19 requests counter-up section 20 to update counter data CTR. Counter-up section 20 reads counter data CTR from CTR memory 15, and updates this value. A simplest updating method is a method for updating counter data CTR to data obtained by adding one to a current counter data CTR. The updating method can be another method e,g., for setting a hash value of the current counter data as next counter data CTR.

UDP data transmitter/receiver 21 combines an UDP header with encrypted communication, data ECD associated with counter data CTR to transmit encrypted communication data ECD with counter data CTR, namely, the UDP packet to receiver 50A via network controller 22.

An operation of receiver 50A will be described below. UDP data transmitter/receiver 60 receives the UDP packet transmitted from transmitter 10A via network controller 59. UDP data transmitter/receiver 60 deletes the UDP header from the UDP packet, and transmits encrypted communication data ECD associated with counter data CTR to data decomposer 51.

Data decomposer 51 reads counter data CTR from encrypted communication data ECD associated with counter data CTR, and transmits counter data CTR to encrypting section 52. Data decomposer 51 reads encrypted communication data ECD from encrypted communication data ECD associated with counter data CTR, and transmits the read data to XOR processor 56.

On the other hand, encrypting section 52 encrypts the read counter data CTR, and generates encrypted counter data E(CTR). Encrypting section 52 sets encrypted counter data E(CTR) as seeds SD of random number generator 55, namely, the common key of the streaming encryption. The seeds SD to be input into random number generators 16 and 55 are not generated by different random number generators, but are generated by the same cryptosystem utilizing the counter data.

Encrypting section 52 requests random number generator 55 to generate a pseudorandom number. This request may be performed by data decomposer 51 or XOR processor 56. Random number generator 55 generates pseudorandom number RN equal to or larger than the data length of encrypted communication data ECD. Random number generator 55 transmits pseudorandom number RN1 to XOR processor 56.

XOR processor 56 receives pseudorandom number RN and performs the XOR operation on encrypted communication data ECD and pseudorandom number RN. The XOR operation performed on a certain value X and a value Y twice provides the original value X. That is, when the XOR operation is performed with the same pseudorandom number twice for the encryption and the decryption, proper decryption can be performed. Therefore, XOR processor 56 decrypts encrypted communication data ECD to communication data CD. XOR processor 56 transmits communication data CD to communication data interpreter 57, and communication data interpreter 57 interprets contents of communication data CD transmitted from transmitter 10A.

Since counter data CTR added to UDP packet PK is not encrypted, a third party can realize the counter data. However, since encrypted counter data E(CTR) is the encrypted counter data CTR, the third party cannot make it. This situation is equivalent to that seed SD generated by this method cannot be predicted by the third party. That is to say, when only the common key of the block encryption is concealed from third party, even if counter data CTR is opened, encrypted counter data E(CTR), namely, seed SD cannot be realized by the third party.

Since counter data CTR is encrypted by the block encryption, a data size of encrypted counter data E(CTR) is a block length of the block encryption. If a seed necessary for the random number generator is smaller than the block length, a part of the encrypted counter data may be used or the encrypted counter data may be subject to a calculating process so as to be reduced to the data size of the seed. On the contrary, if the seed necessary for the random number generator is larger than the block length, the encrypted counter data may be subjected to a calculating process so as to be expanded to the data size of the seed. Such a method includes various methods, and any method may be used.

Figure 2:
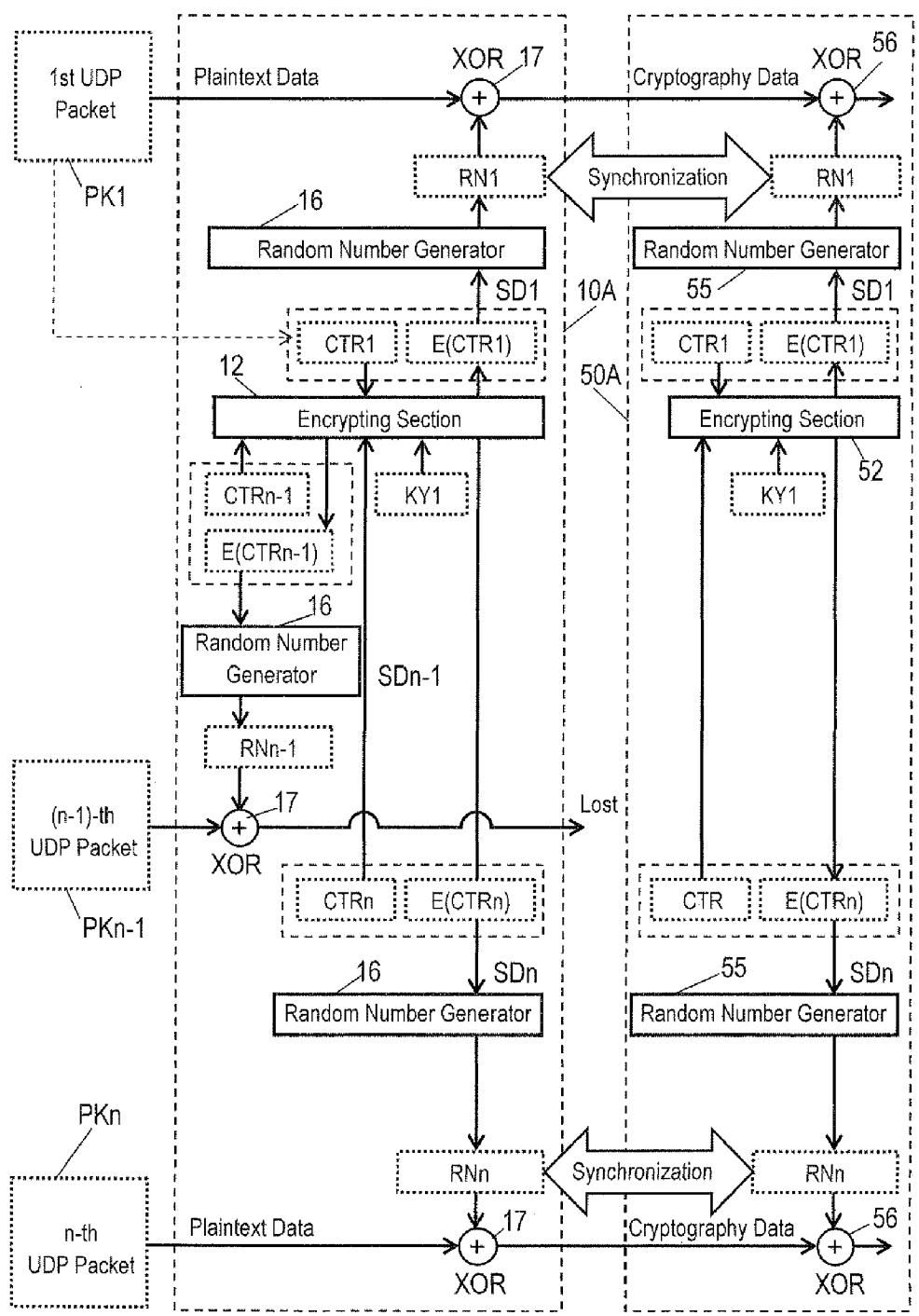
FIG. 2 is a timing chart illustrating an operation of the communication system according to Embodiment 1.

Synchronization gap control in the case where packets are lost will be described with reference to FIG. 2. FIG. 2, illustrates the transmitting and receiving of the first packet PK1, . . . , the (N–1)-th packet PKn-1, and the N-th packet PKn (N and n are not smaller than 3). In FIG. 2, counter data CTR1, . . . , CTRn-1, and CTRn, start from 1, and CTR1, CTR2, CTR3 . . . are 1, 2, 3, . . . , respectively. The counter data encrypted by encrypting sections 12 and 52 are E(CTR1), E(CTRn-1), and E(CTRn). Encrypting sections 12 and 52 encrypt counter data CTR so as to set seed SD for each packet.

Since the UDP communication is connectionless communication differently from the TCP communication, packets might be lost on the communication path or the arrival order of the packets might be reversed. For example, when a router process on the communication path is busy, the UDP packets are easily lost.

Transmitter 10A transmits packet PK1 to receiver 50A. Packet PK1 includes counter data CTR1. Receiver 50A reads counter data CTR1 from received packet PK1, and encrypting section 52 encrypts this so as to acquire encrypted counter data E(CTR1). Random number generator 55 generates pseudorandom number RN1 with using encrypted counter data E(CTR1) as a seed SD1. XOR processor 56 decrypts the encrypted communication data included in packet PK1 with using the generated pseudorandom number RN1.

This process is repetitively performed, and transmitter 10A sets seed SD for each packet, and sequentially transmits the packets PK1, PK2, PK3, to receiver 50A. Transmitter 10A generates pseudorandom number RNn-1 and transmits packet PKn-1 associated with encrypted counter data E(CTRn-1) to receiver 50A. If packet PKn-1 is lost somewhere on the communication path, receiver 50A does not receive lost packet PKn-1.

In the above situation, transmitter 10A generates pseudorandom number RNn, and transmits packet PKn associated with encrypted counter data E(CTRn) to receiver 50A. Packet PKn is not lost, and is received by receiver 50A. Since the seed is set for each packet, packet PKn includes the encrypted communication data and counter data CTRn as information for decrypting the encrypted communication data.

Encrypting section 52 encrypts counter data CTRn based on received packet PKn and generates encrypted counter data E(CTRn) so as to input encrypted counter data E(CTRn) as seed SDn of random number generator 55. Random number generator 55 generates pseudorandom number RNn for the data size of a data portion in packet PKn. Receiver 50A does not receive the packet PKn-1. However, since counter data CTRn can read from packet PKn, counter data CTRn is encrypted so that the encrypted data included in packet PKn can be decrypted. As a result, the encryption and the decryption of packet PKn can be synchronized without a problem. This is because the seed is generated based on the counter data for each packet, and the pseudorandom number is generated based on the seed, differently from normal streaming encryption.

The transmitter transmits, to the decrypting apparatus, the packet information used for generating the key and the plaintext data encrypted with using the key as a single packet. This operation allows the receiver to receive the information necessary for generating the key in the decrypting process for decrypting the cryptography data. As a result, even if packets are lost or the order of the packets is changed during the transmission of the packets, the synchronization gap between the transmitting side and the receiving side can be repressed. Particularly in the UDP communication where the packet loss and the changed arrival order of the packets possibly occur, the encrypting and decrypting processes can be satisfactorily executed. Further, differently from the encryption and decryption in the streaming encryption, even if an improper packet including counter data to arrive at a fairly advancing order is transmitted, this communication system is prevented from resulting in an unserviceable status.

In general, a processing speed of the block encryption is lower than that of the streaming encryption. According to Embodiment 1, since the block encryption is utilized for generating a seed of the streaming encryption, the number of processing times in the block encryption per packet can be reduced further than a case where plaintext is encrypted directly by the block encryption. Thus, a total processing speed can be increased.

A comparison of the processing speed of the system according to Embodiment 1 (the streaming encryption is applied to the XOR processor and the random number generator, and the block encryption is applied to the encrypting section) with the processing speed of the simple block encryption will be described below. In the UDP communication of the sound/image communication that requires the real-time characteristics, UDP communication of about 128 bytes or 256 bytes is performed. If the encryption and decryption are performed by the block cryptosystem adopting the AES encryption, one packet having 128 bytes and a processing unit of the block encryption is 16 bytes, the encrypting and decrypting processes are executed eight times for processing one packet. When this method is used, however, one-time AES encryption of 128 bits is necessary for processing one packet, but after that, the encrypting and decrypting processes can be executed by Arcfour of 128 bytes. If the processing speed of Arcfour is twice the processing speed of the AES encryption of 128 bits, the processing speed for one packet of 128 bytes becomes five times the speed of the AES encryptions of 128 bits. That is, the process can be executed at about 1.6 times the speed of the simple block encryption. Actually since processing time is further necessary for setting the seed of Arcfour, the processing speed is lower than the above speed, but when the data size of one packet is increased, the processing speed is further increased.

In the UDP communication for the sound/image communication that requires the real-time characteristic, the encrypting and decrypting processes of the present embodiment can be executed at a high speed, and both the cryptographic communication and the high-speed communication can be achieved. The encrypting and decrypting process in encrypting sections 12 and 52 can utilize not the block encryption but the streaming encryption. When the streaming encryption such as Arcfour whose processing speed is higher than that of the block encryption is used as the streaming encryption in the software process, the high-speed encrypting and decrypting process can be executed.

Figure 3:
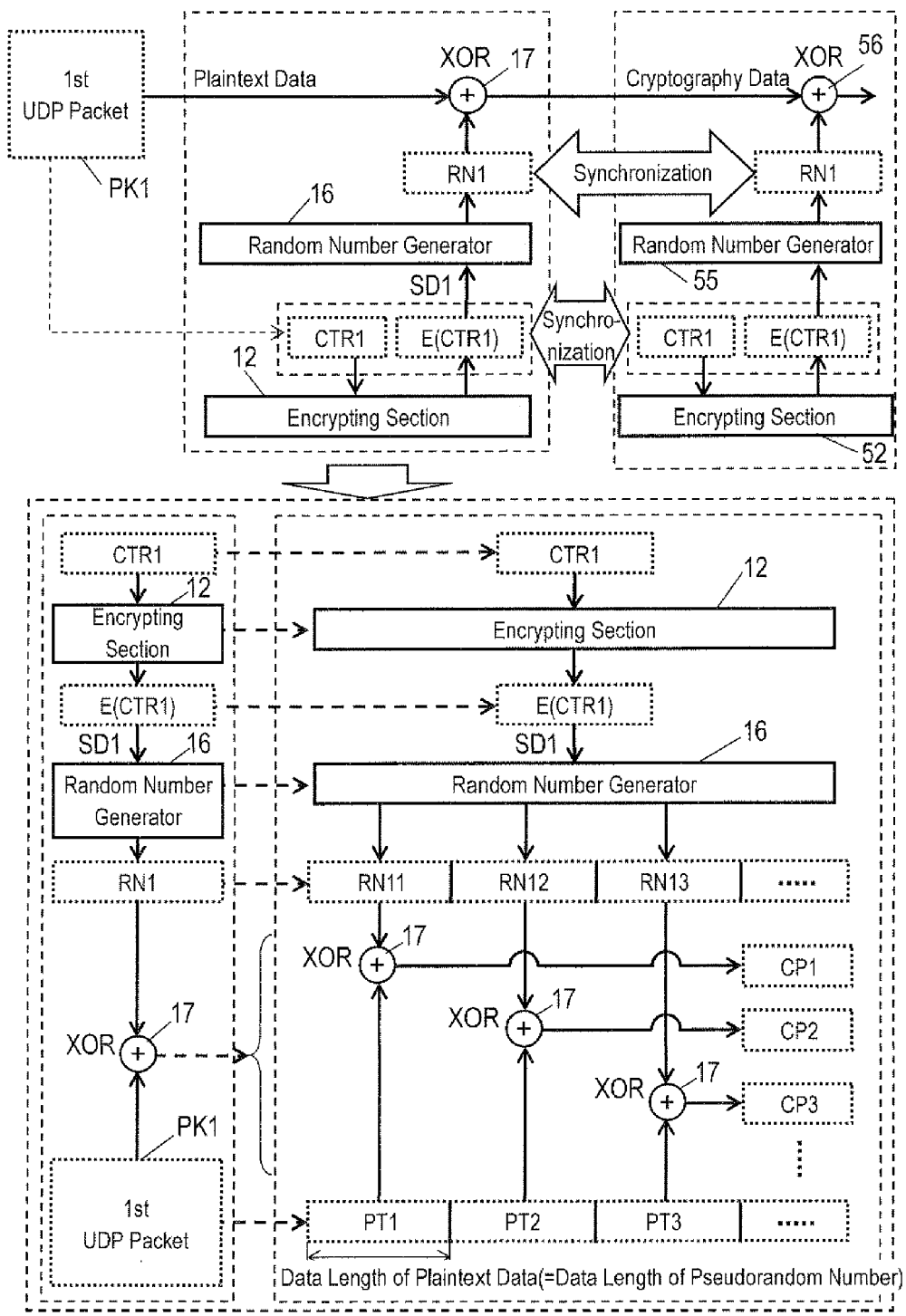
FIG. 3 is an explanatory diagram illustrating an operation of a transmitter according to Embodiment 1.

FIG. 3 illustrates details of main elements of transmitter 10A. The main elements include encrypting section 12, random number generator 16, and XOR processor 17 surrounded by a frame of a broken line shown on the upper part of FIG. 3. The lower part of FIG. 3 illustrates the details of the main elements. Only the process for counter data CTR1 is illustrated.

Upon having counter data CTR encrypted by encrypting section 12, namely, encrypted counter data E(CTR) input into random number generator 16, random number generator 16 generates pseudorandom numbers RN1. Pseudorandom numbers RN1 includes random sequence RN11, RN12, RN13, . . . . On the other hand, plaintext data is composed of plain texts PT1, PT2, PT3, The data lengths of plain texts PT1, PT2, and PT3 match data lengths of random numbers of random sequence RN11, RN12, RN13, . . . respectively. Therefore, XOR processor 17 sequentially performs the XOR operation on plain text PT1 and random sequence RN11, on plain text PT2 and random sequence RN12, and on plain text PT3 and random sequence RN13, . . . to generate calculation results, i.e., cryptography data CP1, CP2, CP3, . . . , respectively. At this time moment, "the encrypted UDP packet" is generated. To encrypt the UDP packet does not mean to encrypt the entire UDP packet. It means generally that a UDP data area in the UDP packet is partially or entirely encrypted. This goes for the following description.

Figure 4:
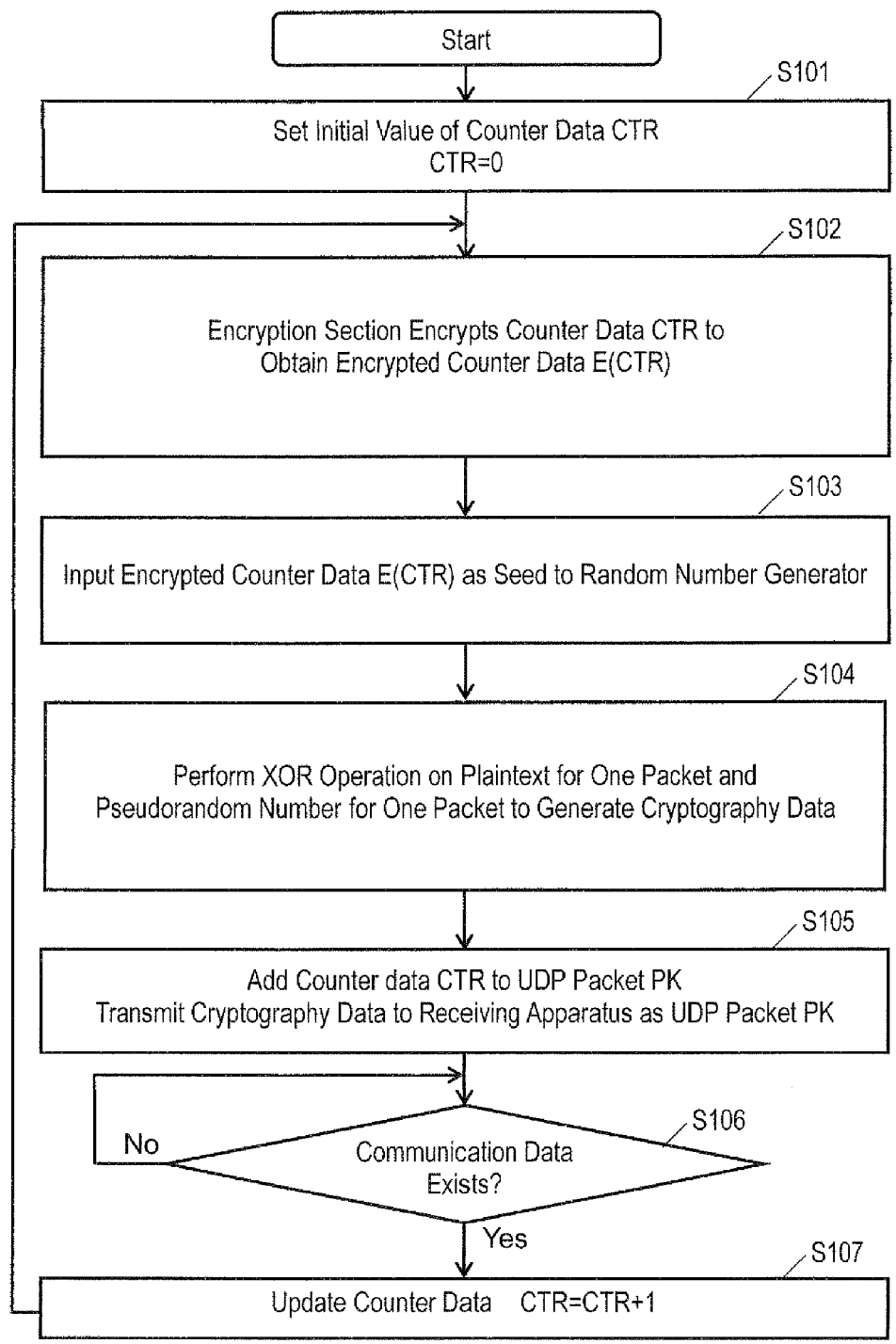
FIG. 4 is a flowchart illustrating the operation of the transmitter according to Embodiment 1.

An operation of transmitter 10A will be described again with reference to a flowchart of FIG. 4. An initial value of counter data CTR is set at step S101. Since counter data CTR may be gained by third people, counter data CTR is not encrypted. The initial value of counter data CTR may be 0 or another value. In actual packetizing, it is desirable that a predetermined initial vector (IV) value is exchanged between transmitter 10A and receiver 50A, and it is mixed with the counter data for improving a security level.

Counter data CTR is encrypted by encrypting section 12 at step S102 provide encrypted counter data E(CTR). For example, if encrypting section 12 performs the AES encryption, the counter CTR is assigned to AES_Encrypt, a cryptographic function of the AES encryption as shown in the following formula.

$$E(CTR)=AES\_Encrypt(CTR)$$

Encrypted counter data E(CTR) is input as a seed of random number generator 16 at step S103. For example, in the case that random number generator 16 performs Arcfour as the streaming encryption, encrypted counter data E(CTR) is assigned to Arcfour_Init, an initialization function of Arcfour as the following formula.

$$Arcfour\_Init(E(CTR))$$

The XOR operation is performed, at step S104, on plaintext data for one packet and pseudorandom numbers having a data size of one packet generated by random number generator 16 so as to encrypt the plaintext data to generate cryptography data for one packet. For example, in the case that the random number generator, namely, the streaming encryption is Arcfour, the plaintext data is assigned to Arcfour_Encrypt, a cryptographic function of Ardour as shown in the following formula.

(Cryptography Data)=Arcfour_Encrypt(Plaintext Data)

Counter data CTR is added to UDP packet PK, and the cryptography data is transmitted to receiver 50A as the UDP packet at step S105.

When transmission data is not prepared at step S106 ("No" at step S106), the process waits for the preparation of the transmission data. No more transmission data exists, the process can be ended.

When the transmission data is prepared ("Yes" at step S106), counter data CTR is updated at step S107. Steps S102 to S107 are executed repetitively. Counter data CTR is increased one by one, but any method may be used as long as counter data CTR to be used next is not the same as counter data CTR used previously. A hash value of counter data CTR can be set as new counter data CTR.

Figure 5:
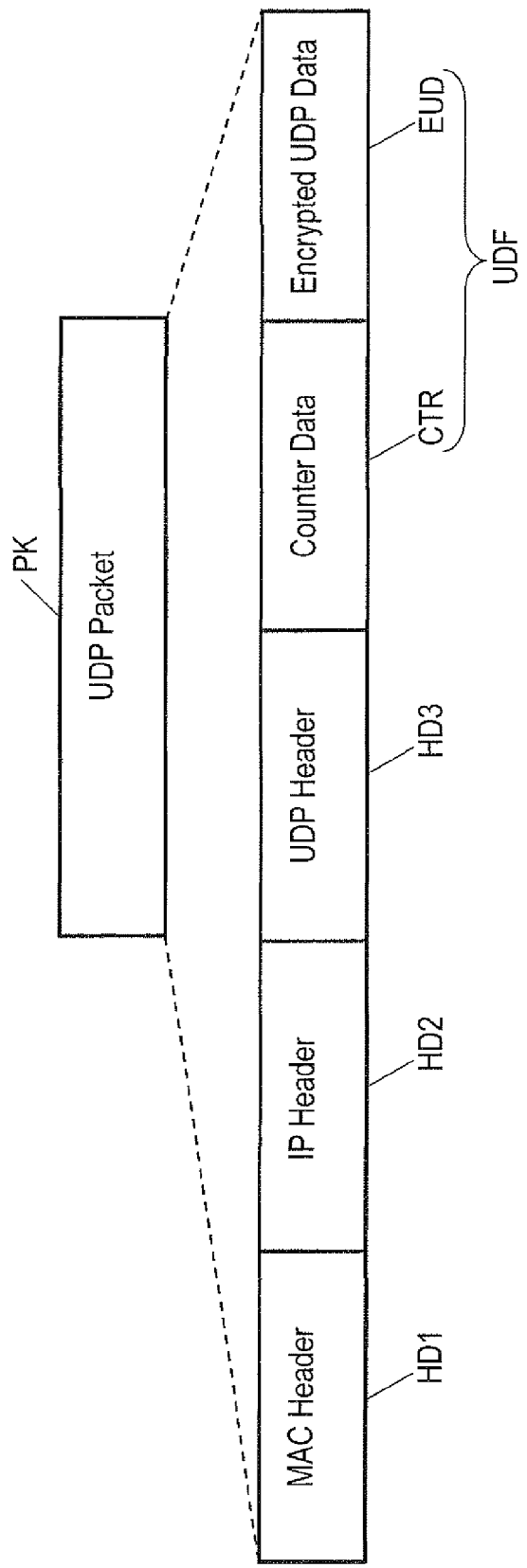
FIG. 5 is an explanatory diagram illustrating a method for packetizing counter data according to Embodiment 1.

UDP packet PK has, as shown in FIG. 5, a header area, and UDP data area UDF. The header area includes MAC header HD1, IP header HD2 and UDP header HD3. UDP data area UDF includes counter data CTR and encrypted UDP data EUD. UDP data area UDF can include MAC or CRC in addition to actual data in order to check falsification and detect a data error.

If the data length of counter data CTR is fixed, receiver 50A easily obtains a position where encrypted UDP data EUD starts. If the data length is added to counter data CTR, even if counter data CTR has a variable length, receiver 50A reads the data length so as to obtain the size of counter data CTR. For this reason, similarly, receiver 50A easily obtain the position where the encryption UDP data EUD starts.

Counter data CTR is, as shown in FIG. 5, set to a head of UDP data area UDF. If counter data CTR is related to UDP packet PK, a position to which counter data CTR is added is not necessarily located in UDP data area IJDF, and counter data CTR can be set on any position of UDP packet PK.

If counter data CTR can be derived from any header (for example, in the case of the sound data, the header of the sound packet) given to the UDP packet, counter data CTR is not necessarily added to UDP packet PK. For example, counter data CTR can be set to a value that can be derived from an existent Ethernet™ header, an IP header, or a UDP header.

Figure 6:
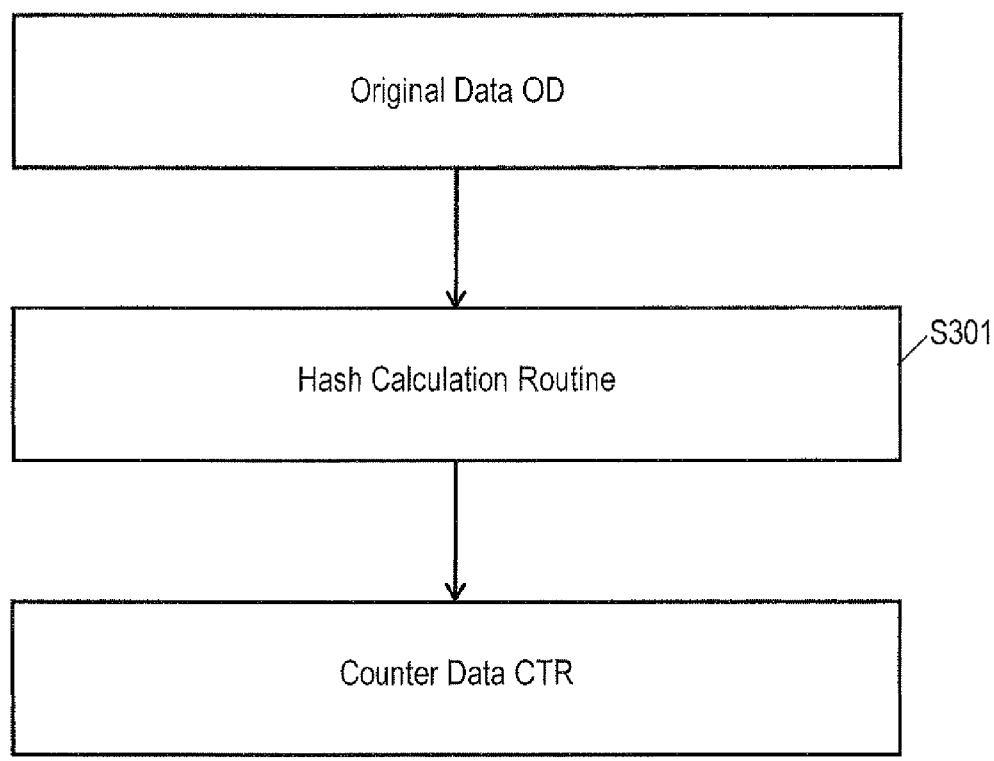
FIG. 6 is a flowchart illustrating a method for calculating the counter data according to Embodiment 1.

Original data from which counter data CTR is derived may be added to UDP packet PK. For example, as shown in FIG. 6, original data OD is processed by a hash calculating routine, namely, a hash value of original data OD is calculated at step S301 as to generate counter data CTR.

Figure 7:
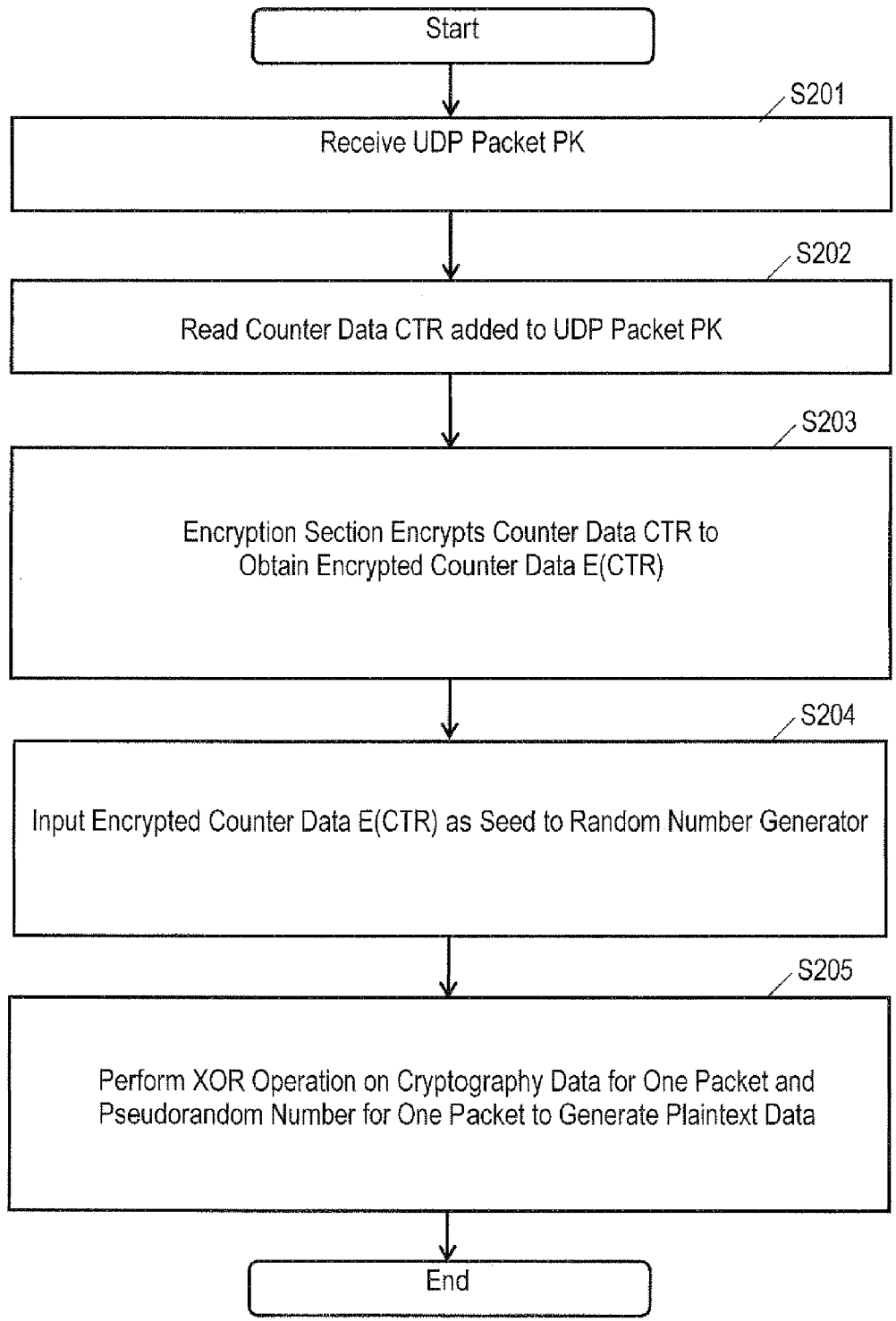
FIG. 7 is a flowchart illustrating an operation of a receiver according to Embodiment 1.

An operation of receiver 50A will be described again with reference to a flowchart of FIG. 7. At first receiver 50A receives UDP packet PK generated by the processes shown in FIG. 4.

Data decomposer 51 reads counter data CTR added to UDP packet PK at step S202. In the case that the predetermined initial vector (IV) value is exchanged between transmitter 10A and receiver 50A and is mixed with the counter data, the IV value is mixed with counter data CTR to calculate new counter data CTR.

Encrypting section 52 encrypts counter data CTR at step S203 so as to obtain encrypted counter data E(CTR). For example, if encrypting section 12 on the transmitting side adopts AES encryption, counter data CTR is input to encrypting section 52 to be assigned to AES_Encrypt, the cryptographic function of AES as shown in the following formula.

E(CTR)=AES_Encrypt(CTR)

Encrypting section 52 inputs encrypted counter data E(CTR) as seed SD into random number generator 55 at step S204. For example, if the streaming encryption performed by random number generator 16 on the transmitting side is Arcfour, encrypted counter data E(CTR) is input to random number generator 55 to be assigned to Arcfour_Init as the initialization function of Arcfour as shown in the following formula.

Arcfour_Init(E(CTR))

Random number generator 55 generates a pseudorandom number with using encrypted counter data E(CTR), and performs the XOR operation on the cryptography data for one packet and the generated pseudorandom number having the data size of one packet at step S205 so as to decrypt the cryptography data to generate plaintext data for one packet. For example, if the streaming encryption performed by random number generator 55 is Arcfour, the cryptography data is assigned to Arcfour_Encrypt as the cryptographic function of Arcfour as shown in the following formula.

(Plaintext Data)=Arcfour_Encrypt(Cryptography Data)

When the UDP packet is transmitted again from transmitter 10A, steps S201 to S206 are executed repetitively.

Figure 8:
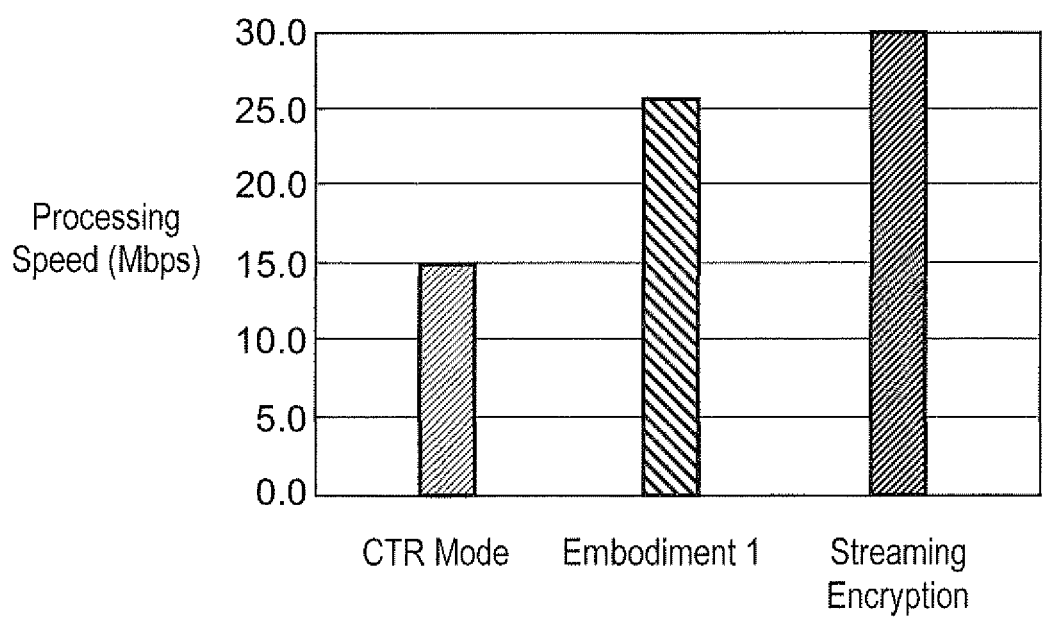
FIG. 8 is a diagram illustrating a measured result of a processing speed according to Embodiment 1.

Effects of this embodiment will be described with reference to FIG. 8. FIG. 8 illustrates processing speeds in the CTR mode of the block encryption, in Embodiment 1, and in the streaming encryption when the data size of one UDP packet is 256 bytes.

The left part of FIG. 8 illustrates the processing speed in the CTR mode of about 15 Mbps. The CTR mode is a mode in which all 256 bytes are encrypted in the AES counter mode of 128 bits. Since the data size of one block of AES of 128 bits is 16 bytes, the number of blocks of 256 bytes is 16 (256/16). Therefore, 16 AES encryption processes (calculation of exclusive OR for additional 256 bytes) are necessary. The counter data is AES-encrypted only once for one UDP packet, and the encrypted counter data can be used for the calculation of exclusive OR for all 256 bytes. However, this mode converts one plaintext into the same cryptography, thus deteriorating its security level remarkably.

The right part of FIG. 8 illustrates the processing speed of the streaming encryption of 31 Mbps. Arcfour is used as the streaming encryption.

The center part of FIG. 8 illustrates the processing speed of about 27 Mbps of the system according to Embodiment 1. The AES counter mode is applied to encrypting sections 12 and 52, and the Arcfour encryption is applied to random number generators 16 and 55 and XOR processors 17 and 56.

According to this embodiment, the counter data is AES-encrypted only once for one UDP packet, and 256 bytes are entirely encrypted by the Arcfour encryption by using the encrypted counter data as a common key (seed) of the Arcfour encryption. One AES encryption and common key setting time are an extra processing time additional to that of an ordinary Arcfour encryption. The Arcfour can usually, in a software process, execute a encrypting/decrypting process in a time less than a half of a time for a encrypting/decrypting process of the AES encryption. The processing time for the encrypting/decrypting process of this embodiment includes the time for one AES encryption (encryption of counter data), the half of the time for sixteen AES encryptions (half of the case of the CTR mode shown on the left portion of FIG. 8), and a time A (a time for setting the common key). The processing time of this embodiment is approximately the time for nine to ten AES encrypting/decrypting processes. The measuring condition was that the CPU was a MIPS, 32 bits, 200 MHz CPU. As the measuring method, a time for creating a UDP header and encrypting data was measured. The data size of the plaintext for one packet was 1024 bytes, and the time required for performing data "0x00" to "0XFF" on data contents four times for 10 M bytes was measured to calculate the processing speed in the units of "bps". High-speed AES was used for the CTR mode, and Arcfour was used for the streaming encryption. According to the measured result, the processing speed of this embodiment is close to the processing speed of the streaming encryption of 31 Mbps on the basis of the block encryption.

According to this embodiment, the counter data encrypted by the block encryption is not used directly for the encrypting/decrypting process for communication data, but the encrypted counter data is used as the common key of the common key encryption for encrypting communication data. The components, such as random number generators 16 and 55 and XOR processor 17 and 56, that perform the streaming encryption shown in FIG. 1 are not limited to the streaming encryption, such as Arcfour, and the components may perform the block encryption, such as AES and 3DES. From a viewpoint of improving the entire processing speed, the processing speed of the cryposystem of the components (random number generators 16 and 55, XOR processor 17 and 56) for performing encryption and decryption is preferably higher than that in the cryptosystem of the components for generating a key (encrypting sections 12 and 52).

A malicious attacker might pretend to be transmitter 10A and intentionally transmit an improper UDP packet to which fairly former counter data is added. For this reason, receiver 50A may perform a MAC check to update maximum counter data only when the packet is proper. In general, in authorized UDP communication, counter data does not extremely skip as long as extreme packet loss does not occur. Therefore, when the counter data skips extremely, it means that great packet loss occurs. For this reason, receiver 50A does not have to store the skipped counter data as receivable data in receiver 50A.

Figure 9:
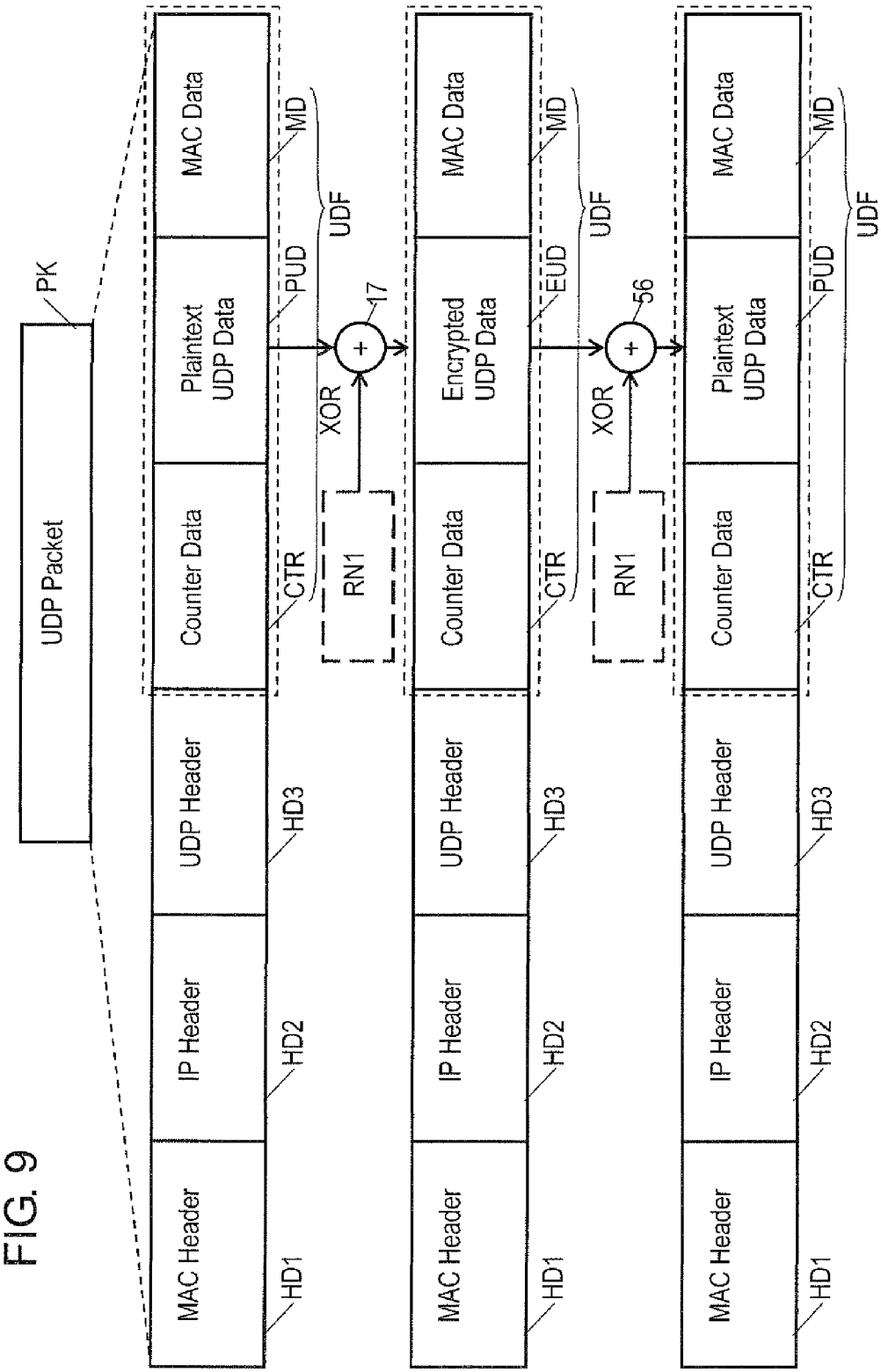
FIG. 9 is an explanatory diagram of an MAC checking according to Embodiment 1.

This structure will be described in detail with reference to FIGS. 9 and 10. FIG. 9 illustrates a format of UDP packet PK at the time of making the MAC check. Transmitter 10A sets counter data CTR, actual UDP data (plaintext UDP data PUD) and MAC data MD in a UDP data area UDF. XOR processor 17 performs the XOR operation on pseudorandom numbers RN1 and plaintext UDP data PUD so as to generate encrypted UDP data EUD. Transmitter 10A sets counter data CTR, encrypted UDP data EUD, and MAC data MD in UDP data area UDF, and transmits UDP packet PK to receiver 50A. Receiver 50A receives UDP packet PK. XOR processor 56 performs the XOR operation on pseudorandom numbers RN1 and encrypted UDP data EUD so as to obtain plaintext UDP data PUD.

Figure 10:
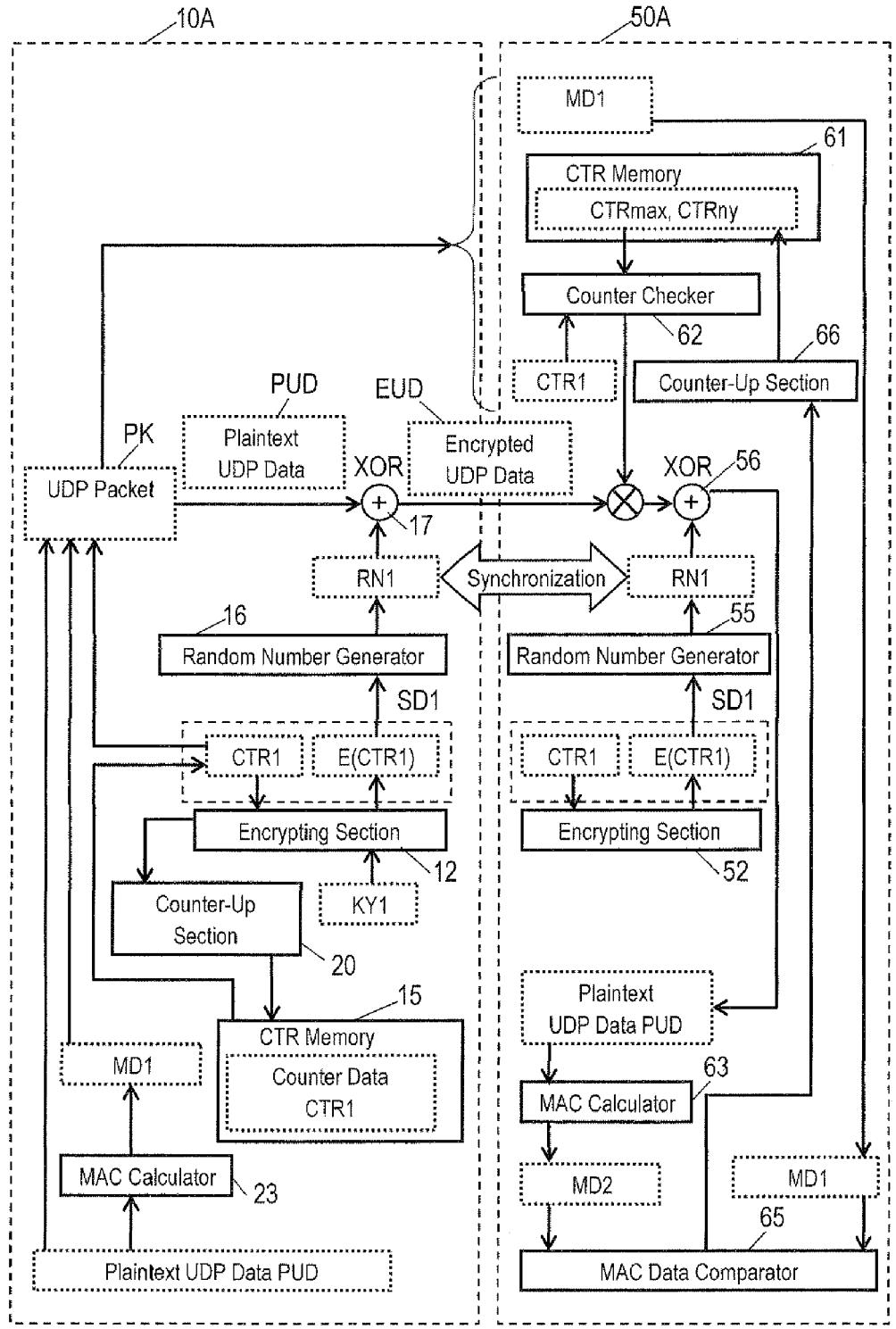
FIG. 10 is an explanatory diagram of the MAC checking according to Embodiment 1.

FIG. 10 illustrates a MAC checking method for a communication in a format of UDP packet PK shown in FIG. 9. Communication apparatus 10A prepares plaintext UDP data PUD, namely, communication data. MAC calculator 23 calculates MAC data MD1 from plaintext UDP data PUD. The MAC calculating method includes various methods, such as MD5, SHA1, and SHA2, but the same calculating method is used in transmitter 10A and receiver 50A.

In FIG. 10, counter data CTR is a serial numbers and is counted up one by one. Transmitter 10A prepare counter data CTR1 to be added to UDP packet PK to be transmitted. Actually, encrypting section 12 reads the current counter data CTR1 from CTR memory 15. Encrypting section 12 and random number generator 16 perform the similar encryption to that of FIG. 2, and generate encrypted UDP data EUD from plaintext UDP data PUD. After the encryption is completed, the counter data is counted up by one in order to prepare for next packet transmission. Actually, encrypting section 12 instructs counter-up section 20 to count up counter data CTR, and stores the counted-up counter data in CTR memory 15.

Transmitter 10A transmits counter data CTR, encrypted UDP data EUD, and MAC data MD1 to receiver 50A. Receiver 50A receives these data. In receiver 50A, the maximum value CTRmax of counter data CTR obtained until this moment is stored in CTR memory 61. CTR memory 61 further stores counter data CTRny that is smaller than the maximum value and is not yet received.

In receiver 50A, counter checker 62 checks the received counter data CTR1. This check is practically made by the following method. Two counter data CTRmax and CTRny are read from CTR memory 61. It is checked whether the received counter data CTR1 is larger than counter data CTRmax or is equal to counter data CTRny. If the received counter data CTR1 is smaller than counter data CTRmax and is not equal to counter data CTRny, UDP packet PK is discarded by counter checker 62. This method protects the system from a re-try attack.

On the other hand, if the received counter data CTR1 is larger than counter data CTRmax or is equal to counter data CTRny, UDP packet PK is not discarded. Encrypting section 52 and random number generator 55 perform the decryption similar to that of FIG. 2, and obtain plaintext UDP data PUD from encrypted UDP data EUD.

MAC calculator 63 calculates MAC data MD2 from plaintext UDP data PUD. MAC data comparator 65 compares the calculated MAC data MD2 with MAC data MD1 added to the received UDP packet. When these MAC data do not match, MAC data comparator 65 does nothing or discards the UDP packet. When these MAC data match, MAC data comparator 65 instructs counter-up section 66 to count up the counter data, and stores the counted-up counter data CTR into CTR memory 61. When the received counter data CTR is larger than a current maximum value, this counter data CTR is stored as a new maximum value. At this moment, if the received counter data CTR skips by two or more from the current maximum value, the skipped counter data CTR is stored as non-received counter data CTR. If the received counter data CTR is the non-received counter data CTR, counter data CTR stored as non-received counter data is deleted.

Embodiment 2

An operation of a communication system according to Exemplary Embodiment 2 will be described with reference to FIG. 11. The communication system according to Embodiment 2 is the same as the communication system according to Embodiment 1 shown in FIG. 1, but is different from Embodiment 1 in its operating method as described below.

Figure 11:
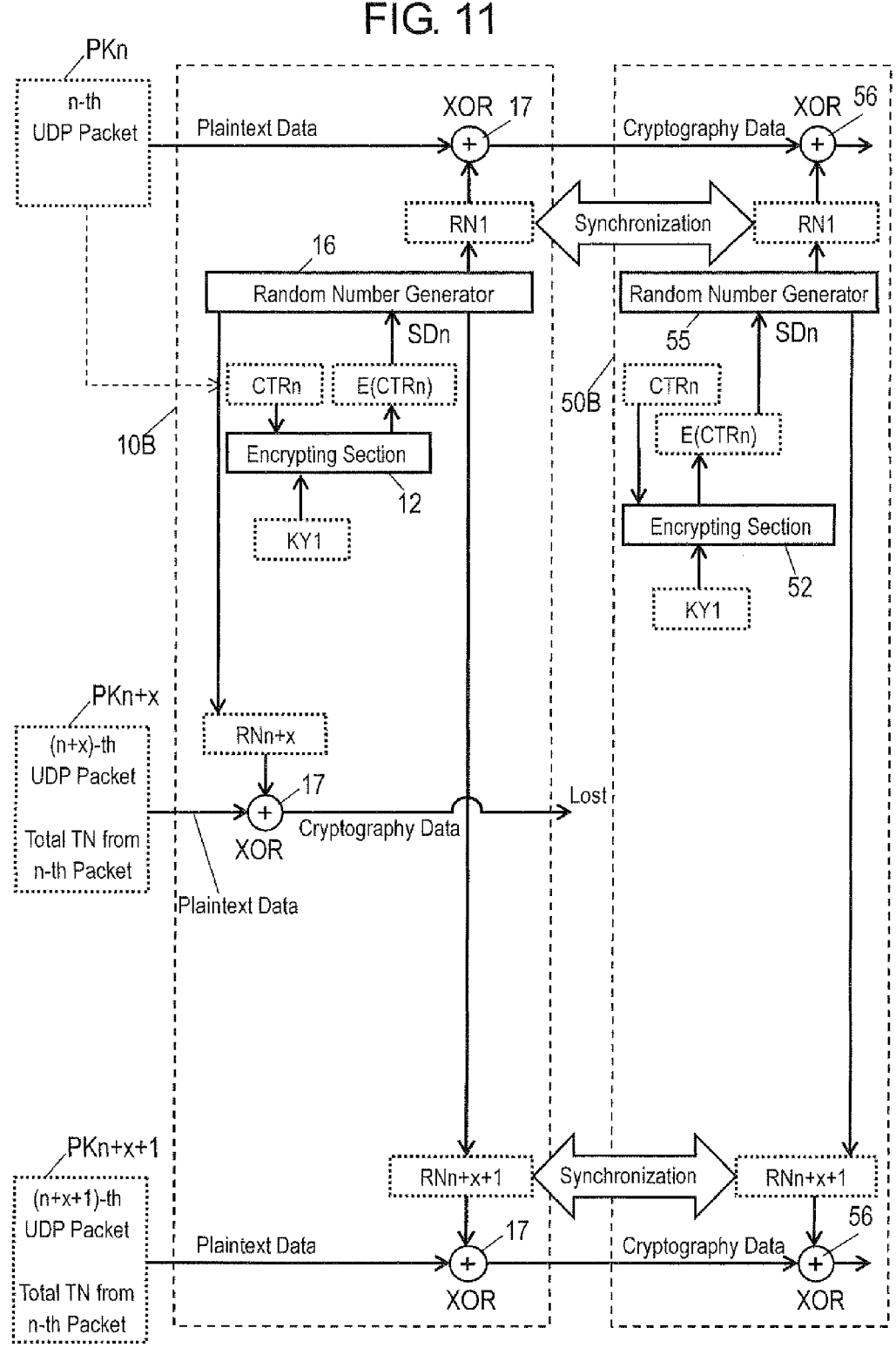
FIG. 11 is a timing chart illustrating an operation of the communication system according to Exemplary Embodiment 2 of the invention.

The operating method shown in FIG. 11 has two different points than the operation method shown in FIG. 2. The first different point is that the random number generator changes a seed for a predetermined packet. For example, when the counter data exceeds a predetermined value or when a number of all communication data in the packet transmitted to the receiving side exceeds a predetermined value, the seed is changed.

The second different point is that the receiver can obtain the number of all communication data from a predetermined packet to a certain packet transmitted. For example, the transmitter describes, in the UDP data area of each of the (n+x)-th packet PKn+x and the (n+x+1)-th packet PKn+x+1, information indicating the total TN of the number of communication data from the n-th packet PKn to packet PKn+x and to packet PKn+x+1 (namely, the total TN of the data size of all packets from packet PKn to packet PKn+x and to packet PKn+x+1), respectively, where x is 1, 2, . . . . In the following description, the total TN of communication data refers to the number of communication data. The total TN(n) of communication data is a total of data sizes of packets PK1, PK2, . . . , PKn, where n is an integer not smaller than 1. The data size of each packet represents the size (unit; bytes) of the data contained in a payload of the packet, but may represents the size of the data contained not only in the payload but also in a header of the packet.

A streaming encryption according to Embodiment 2 uses pseudorandom numbers that do not depend on communication data. The random number generator adopts the streaming encryption, such as Ardour, that is independent from the communication data. Streaming encryptions, such as the CBC mode, depending on communication data (streaming encryptions utilizing an operation mode of block encryption) is not used as the streaming encryption according to Embodiment 2.

Receiver 50B obtains the number of communication data, and can realize the data size of the communication data transmitted by transmitter 10B before each UDP packet (UDP data section) is transmitted. As a result, before each UDP packet is decrypted, the random number generator generates pseudo-random numbers the number of which is equal to the number of the communication data. In this case, even if some UDP packets are lost, synchronization can be achieved.

An operation of the transmitter according to Embodiment 2 will be described with reference to FIG. 12. At first, an initial value of counter data CTR is set at step S111. Since counter data CTR may be known to a third party, the initial value may be 0 or another value. Actually, a predetermined initial vector (IV) value is exchanged between transmitter 10B and receiver 50B, and this is mixed with counter data CTR, thereby improving a security level.

It is checked at step S112 whether or not counter data CTR exceeds a predetermined value N. It is checked practically whether the following equation is satisfied or not:

CTR mod $N=0$.

When (CTR mod N) is not equal to zero ("No" at step S112), namely, a remainder obtained by dividing N by counter data CTR is not 0, the process advances to step S116. For example, in the case that N is 5, if counter data CTR is 1, 2, 3, 4, 6, 7, 8 . . . , the process advances to step S116. On the other hand, if CTR mod N=0 ("Yes" at S112), namely, a remainder obtained by dividing N by counter data CTR is 0, the number TN of communication data TN is set to 0 at step S113.

Counter data CTR is encrypted by encrypting section 12 at step S114 to obtain encrypted counter data E(CTR). For example, if encrypting section 12 performs the AES encryption, counter data CTR is assigned to AES_Encrypt, a cryptographic function of AES as shown in the following formula.

E(CTR)=AES_Encrypt(CTR)

The present invention is not limited to a case where counter data CTR exceeds a predetermined value N (namely, a case of exceeding plural counter data), and the present invention can be applied to a case where counter data CTR exceeds only predetermined counter data. The operation may be performed at every predetermined number of steps. For example, if the number of steps is 10, timing of the counter data can be every 10 such as 10, 20, 30, . . . .

Encrypted counter data E(CTR) is input as seed SD to random number generator 16 at step S115. For example, in the case that random number generator 16 performs Arcfour as the streaming encryption, this encrypted counter data E(CTR) is assigned to Arcfour_Init as the initialization function of Arcfour as shown in the following formula.

Arcfour_Init(E(CTR))

The XOR operation is performed on plaintext data for one packet and a pseudorandom number, having a data size of one packet, generated by random number generator 16 so as to generate cryptography data for one packet. For example, in the case that the random number generator, namely, the streaming encryption is Arcfour, the plaintext data is assigned to Arcfour_Encrypt, a cryptographic function of Arcfour as shown in the following formula.

(Cryptography Data)=Arcfour_Encrypt(Plaintext Data)

Counter data CTR and the number TN(n) of communication data are added to UDP packet PK, and this UDP packet is transmitted to receiver 50B.

The number TN(n) of communication data is updated at step S118. The data size of UDP packet PK is added to the number of previous communication data TN(n) to obtain a number TN(n+1) of communication data and store the number TN(n+1) in a predetermined memory.

If transmission data is not prepared at step S119 ("No" at step S119), the process waits for the preparation of the transmission data. If the communication data does not exist, the process may be ended. On the other hand, if transmission data is prepared ("Yes" at step S119), counter data CTR is updated at step S120. Then, steps S112 to S120 are executed repetitively.

An operation of the receiver according to Embodiment 2 will be described with reference to FIG. 13. In receiver 50B, a memory stores the number RD of next communication data. The number RD of next communication data is a total of the number of communication data from a predetermined packet to a certain packet that are received by the receiver when the transmitter sequentially transmits the predetermined packet thorough the certain packet without the loss of packet and a change in an arrival order of packets. An initial value of the number RD of next communication data is 0. At first, UDP packet PK generated by the process shown in FIG. 12 is received at step S211.

Counter data CTR and the number TN(n) of communication data added to UDP packet PK are read at step S212.

It is checked whether counter data CTR exceeds a predetermined value is N at step S213. It is checked practically whether the following equation is satisfied or not:

CTR mod $N=0$

Figure 12:
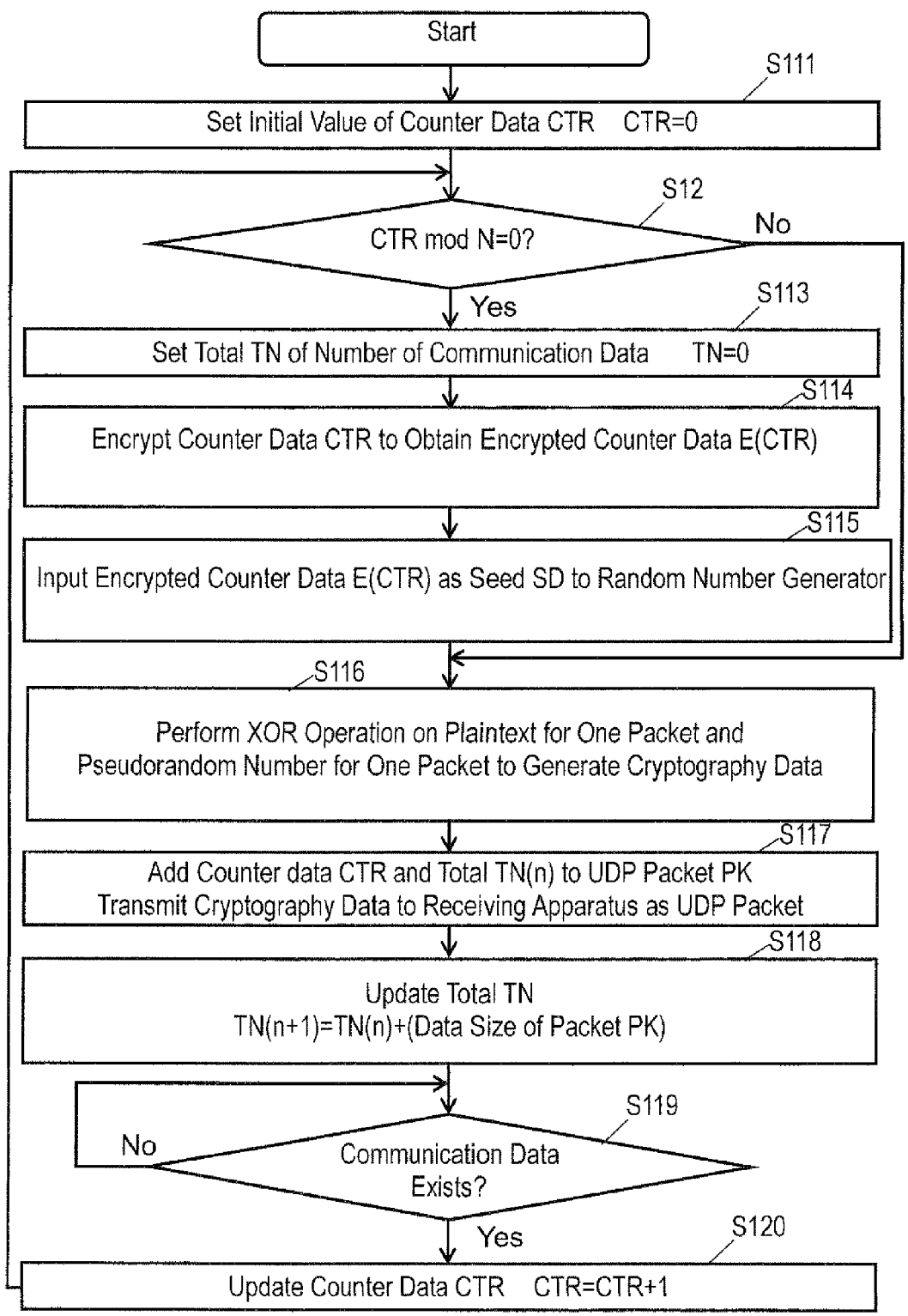
FIG. 12 is a flowchart illustrating an operation of a transmitter according to Embodiment 2.
Figure 13:
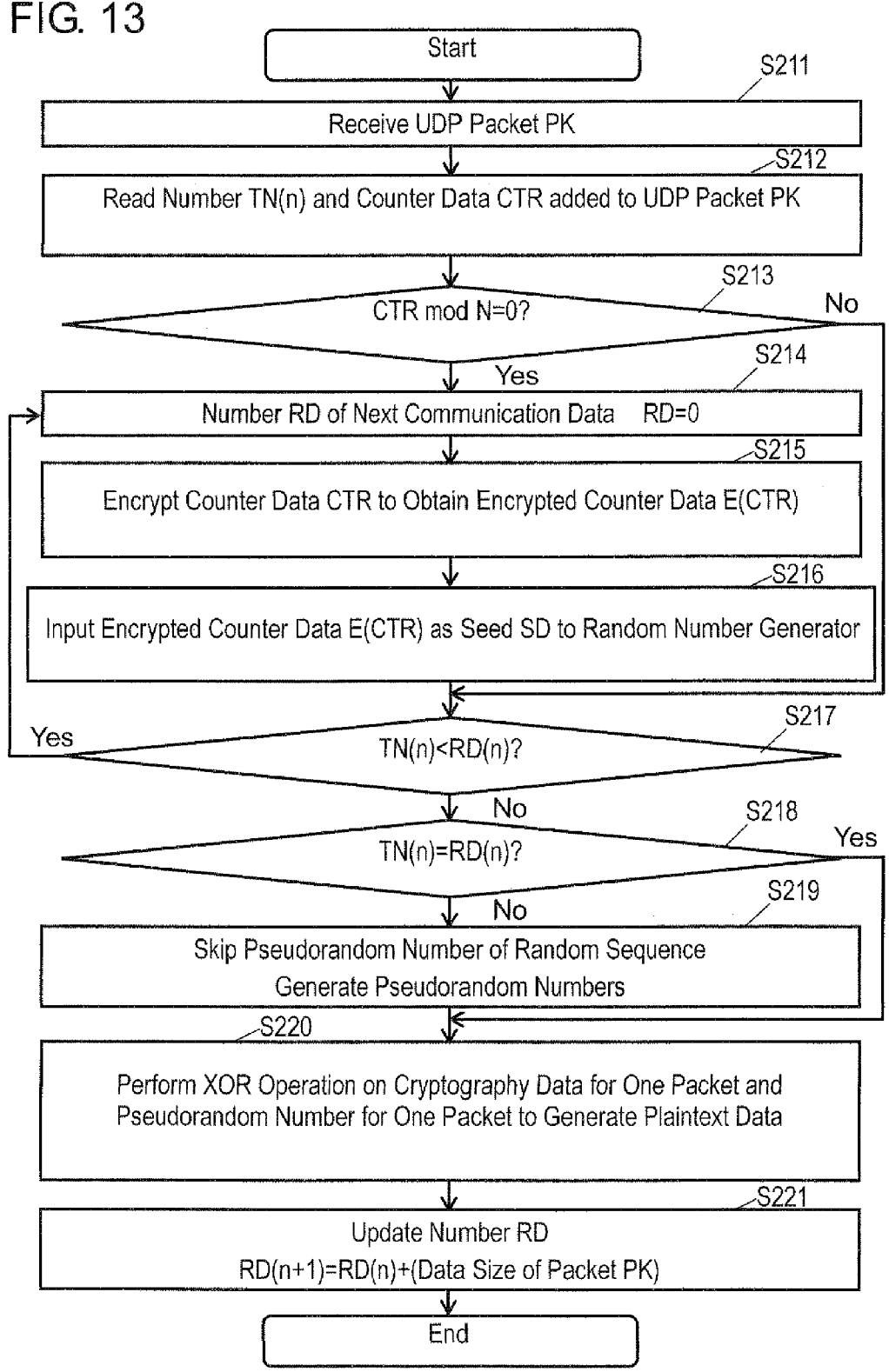
FIG. 13 is a flowchart illustrating an operation of a receiver according to Embodiment 2.

This process is similar to step S112 shown in FIG. 12.

When (CTR mod N) is not equal to zero ("No" at step S213), the process advances to S217. When CTR mod N=0 ("Yes" at step S213), the number RD of next communication data that is 0 is stored in a predetermined memory at step S214. If the read number TN(n) of communication data is not 0, UDP packet PK is discarded as an error.

Counter data CTR is encrypted by encrypting section 52 at step S215 to obtain encrypted counter data E(CTR). For example, if encrypting section 12 on the transmitting side adopts AES encryption, counter data CTR is assigned to AES_Encrypt, the cryptographic function of AES as shown in the following formula.

$$E(CTR)=AES\_Encrypt(CTR)$$

Encrypted counter data E(CTR) is input as seed SD to random number generator 55 at step S216. For example, if the streaming encryption performed by random number generator 16 on the transmitting side is Arcfour, this encrypted counter data E(CTR) is assigned to Arcfour_Init, the initialization function of Arcfour as the initialization function of Arcfour as shown in the following formula.

$$Arcfour\_Init(E(CTR))$$

The read number TN(n) of communication data is compared with the number RD(n) of next communication data, at step S217. If the read number TN(n) of communication data is smaller than the number RD(n) of next communication data ("Yes" at step S217), the process advances to step S214 since the arrival order of packets is reversed and the received UDP packet PK is an unprocessed packet having the counter data smaller than processed packets. If any unprocessed packets having counter data smaller than that of the processed packets does not exist ("No" at step S217), the received UDP packet PK is discarded since the status that the read number TN(n) communication data is smaller than the number RD(n) of next communication data is improper.

If the number TN(n) of communication data is equal to the number RD(n) of next communication data at step S218 ("Yes" at step S218), the process advances to step S220. If the number TN(n) of communication data is not equal to the number RD(n) of next communication data ("No" at step S218), the order of pseudorandom numbers of the random sequence is skipped at step S219 since packets are lost or the arrival order of the packets is reversed. Practically, random number generator 55 generates a random sequence consisting of pseudorandom numbers the number of which is equal to the number of communication data obtained by subtracting the number RD(n) of next communication data from the number TN(n) of communication data. This random sequence is not immediately used, and is stored in a predetermined memory for the case where UDP packets PK corresponding to the pseudorandom numbers of the random sequence are received. This operation eliminates a process to generate pseudorandom numbers again and a process at step S217 returning to step S214. A random sequence corresponding to a packet is set according to the number TN(n) of communication data TN(n). This setting process is executed by the CPU.

The XOR operation is performed on cryptography data of one packet and a pseudorandom number having a data size of one packet generated by random number generator 52 so as to generate plaintext data for one packet at step S220. For example, if the streaming encryption performed by random number generator 55 is Arcfour, cryptography data is assigned to Arcfour_Encrypt, a cryptographic function of Arcfour as shown in the following formula.

$$(Plaintext\ Data)=Arcfour\_Encrypt(Cryptography\ Data)$$

The number RD(n) of next communication data is updated at step S221, and is stored in a predetermined memory. Practically, a value obtained by adding the data size of one packet to the number RD(n) of communication data RD(n) is stored as the number RD(n+1) of next communication data in a predetermined memory. When a UDP packet is transmitted again from transmitter 10B, steps S211 to S221 are executed repetitively.

Thus, receiver 50B obtains the number of communication data transmitted before packet PKn+x+1 so as to realize that packet PKn+x is lost or the order of packets is reversed. In order to decrypt packet PKn+x+1, a difference is calculated by subtracting the number of communication data transmitted before packet PKn+x−1 from the number of communication data transmitted before packet PKn+x+1. Random number generator 55 generates pseudorandom numbers the number of which is equal to the difference. If a data size of a data section of one packet is fixed, transmitter 10B does not necessarily describe the number of transmitted communication data in the data section of the UDP packet. Receiver 50B reads counter data from the UDP packet so as to obtain the number of communication data transmitted from transmitter 10B.

The pseudorandom number to be used for packet PKn+x+1 is equal to pseudorandom number RNn+x+1 used for encryption by transmitter 10B, and thus synchronization is achieved to decrypt the packet properly.

Differently from the encrypting/decrypting process using the streaming encryption, even if a malicious attacker pretends to be transmitter 10B and sends a UDP packet having fairly former counter data to receiver 50B, the operation is not in an unserviceable state while a longer time than the process shown in FIG. 2 is required. Even when a UDP packet having the fairly former counter data is sent, receiver 50B only generates a random sequence based on the number N, N+1, N+2, .... For this reason, the operation can cope with this for short time. Since the packet encrypting/decrypting process is mostly executed by the streaming encryption, such as Arcfour, having a high processing speed, the encrypting/decrypting process can be executed at a higher speed than the process shown in FIG. 2 while an additional processing time for adding the number of communication data is required.

Transmitter 10B adds information about the number of communication data to the UDP packet, namely, describes the number of communication data in the UDP packet so that receiver 50B can obtain the number of communication data transmitted by transmitter 10B after setting the seed. However, the data size of the data section in the UDP packet transmitted and received between transmitter 10B and receiver 50B may be fixed, namely, the number of communication data transmitted as one UDP packet may be previously determined. This process eliminates a process that the number of communication data is described in the UDP packet, thereby providing a higher-speed UDP communication.

According to Embodiment 2, the encrypting/decrypting process can be executed at a high speed by the UDP communication of the sound/image communication that requires real-time characteristic. As a result, the cryptographic communication and the high-speed communication can be combined.

When packets are not lost and the arrival order of the packets is not changed, seed SD is not necessarily input every time, and pseudorandom numbers are not necessarily generated additionally, accordingly providing the decrypting process having a high speed.

This system according to this embodiment performs e high-speed cryptographic communication by the UDP communication, and further, eliminates an encrypting process, such as the AES counter mode, having a low speed, thus providing the higher-speed encrypting/decrypting process.

Embodiment 3

Figure 14:
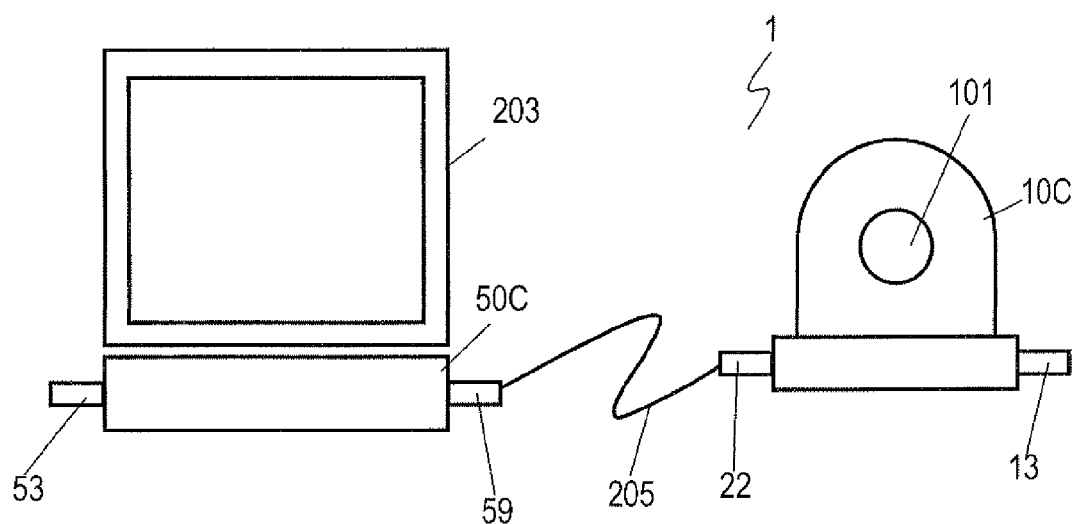
FIG. 14 is an overall view of a monitoring system according to Exemplary Embodiment 3 of the invention.

FIG. 14 is a schematic view of a monitoring system according to Exemplary Embodiment 3. FIG. 14 illustrates monitoring system 1 that is a communication system. Monitoring system 1 includes personal computer (PC) 50C and network camera 10C. PC 50C and network camera 10C are connected via network cable 205. PC 50C is a receiver receiving images. Monitor 203 displays the received images. Network controller 59 and key setting section 53 are adapted to be connected externally to PC 50C. Network controller 59 is connectable to a network cable, and controls network communication. Key setting section 53 exchanges key data with an external memory, such as a universal serial bus (USB) interface, and sets a key.

Network camera 10C is a transmitter performing monitoring. Network camera 10C includes camera section 101 and network controller 22. Key setting section 13 are adapted to be connected externally to network camera 10C. Camera section 101 captures an image, and generates image data. Network controller 22 is connectable with the network cable, and controls network communication. Key setting section 13 exchanges key data with an external memory, such as a USB interface, similarly to key setting section 53, and sets a key. As network cable 205, various cables, such as an Ethernet cable or a serial cable, can be used. A cable is not necessary for wireless communication.

Figure 15:
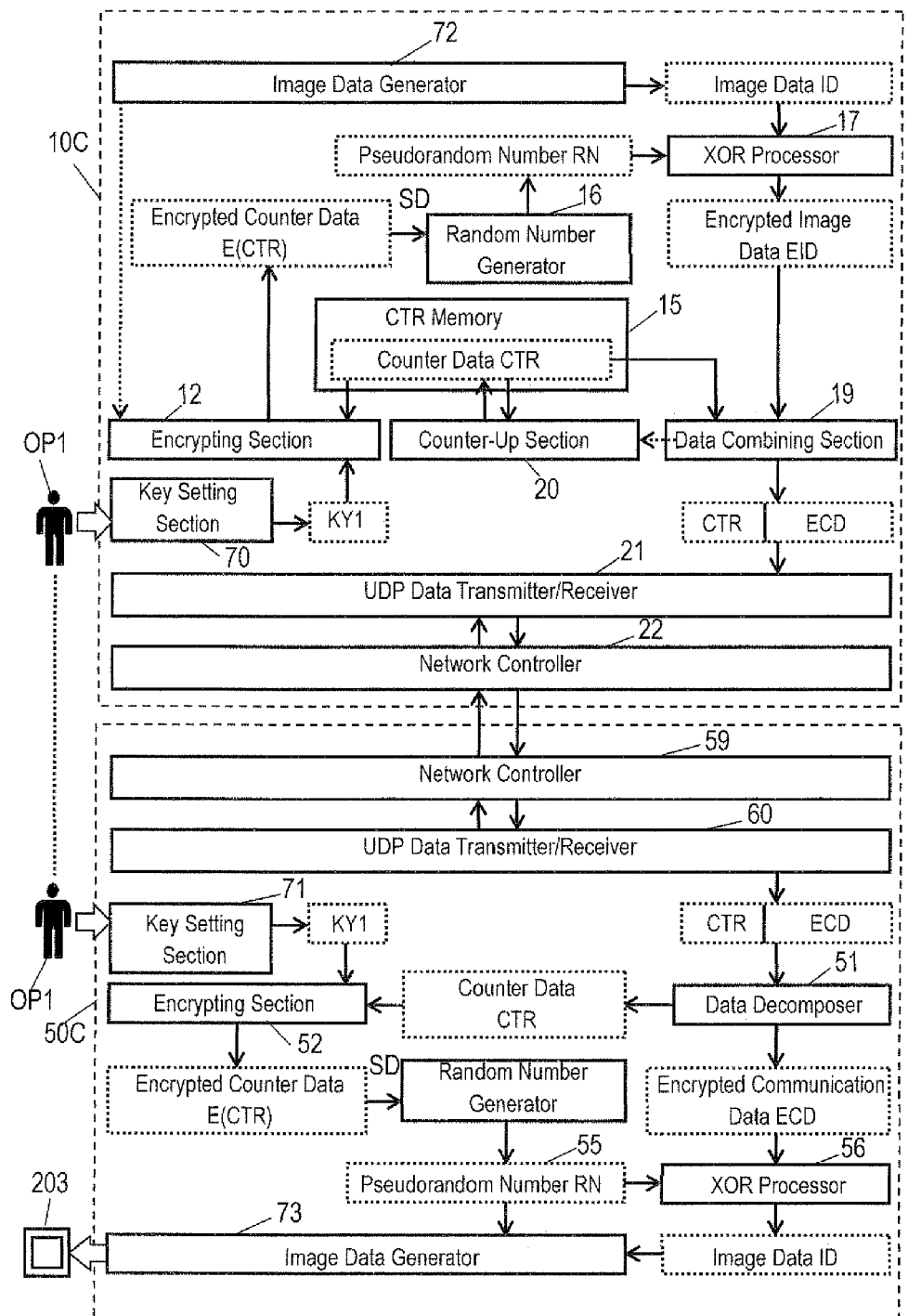
FIG. 15 is a functional block diagram of the monitoring system according to Embodiment 3.

FIG. 15 is a functional block diagram of the monitoring system shown in FIG. 14. Components common with those shown in FIG. 1 are denoted by the same reference numerals. Before image communication is started, presetting is performed. Encrypting section 12 and encrypting section 52 are block encrypting sections that execute the counter mode, and same key KY1 is set in both sections.

At first, an operator OP1 prepares key KY1 in a USB memory. The operator OP1 inserts the USB memory into key setting section 70 having an USB interface function. Key setting section 70 reads key KY1 from the USB memory, and sets key KY1 in encrypting section 12.

The operator OP1 inserts the USB memory also into key setting section 71 having an USB interface function. Key setting section 71 reads key KY1 from the USB memory, and sets key KY1 in encrypting section 52. The operator OP1 inserts the USB memory into key setting section 70 first, but may insert it into key setting section 71 first. The key is set by using the USB memory, but similarly to FIG. 1, the key can be set automatically by using a public key cryptosystem without the operator OP1.

Camera section 101 captures images. Image data generator 72 generates image data ID and sends image data ID to XOR processor 17. At the same time, camera section 101 notifies encrypting section 12 of the start of the encrypting process. XOR processor 17 may notify section 12 of the start of the encrypting process.

Encrypting section 12 reads current counter data CTR from CTR memory 15, and encrypts this counter data CTR so as to generate encrypted counter data E(CTR). Encrypted counter data E(CTR) is set as seed SD to random number generator 16. An initial value of the counter data may be any value.

Encrypting section 12 requests random number generator 16 to generate a pseudorandom number. This request may be performed by camera section 101 or XOR processor 17. Random number generator 16 generates a pseudorandom number having a data length larger than that of image data ID. Pseudorandom number RN is sent to XOR processor 17.

XOR processor 17 receives pseudorandom number RN, performs the XOR operation on image data ID and the pseudorandom number so as to generate encrypted image data EID, and sends this encrypted communication data EID to data combining section 19. The XOR operation is performed on image data ID and the pseudorandom number at once, but may be performed successively.

Data combining section 19 reads the current counter data CTR from CTR memory 15, and adds counter data CTR to encrypted image data EID. Data combining section 19 generates encrypted image data RID associated with counter data CTR, and send it to UDP data transmitter/receiver 21.

Data combining section 19 requests counter-up section 20 to update counter data CTR. Counter-up section 20 reads counter data CTR from CTR memory 15, and updates counter data CTR. A simple updating method is a method for setting next counter data obtained by increasing current counter data by one. However, any updating method, such as a method for setting a hash value of current counter data as next counter data, may be used. A method not producing the same counter data is desirably used.

UDP data transmitter/receiver section 21 adds a UDP header to encrypted image data EID with counter data CTR, and transmits encrypted image data EID with counter data CTR to PC 50C via network controller 22.

In PC 50C, UDP data transmitter/receiver 60 receives a UDP packet including encrypted image data EID with counter data CTR via network controller 59.

Data decomposer 51 receives encrypted image data EID with counter data CTR from UDP data transmitter/receiver 60. Counter data CTR is extracted from encrypted image data ETD with counter data CTR, and is sent to encrypting section 52. Further, encrypted image data EID is extracted from encrypted image data EID with counter data CTR, and is sent to XOR processor 56.

Encrypting section 52 encrypts counter data CTR so as to generate encrypted counter data E(CTR). Encrypting section 52 sets encrypted counter data E(CTR) as seed SD of random number generator 55.

Encrypting section 52 requests random number generator 55 to generate pseudorandom number RN. This request can be made by data decomposer 51 or XOR processor 56. Random number generator 55 generates pseudorandom number RN having a data length equal to or larger than that of encrypted image data EID, and send pseudorandom number RN to XOR processor 56.

XOR processor 56 receives pseudorandom number RN and performs the XOR operation on encrypted image data EID and pseudorandom number RN so as to obtain image data ID. XOR processor 56 sends image data ID to image data generator 73. Image data generator 73 displays, on monitor 203, image data ID transmitted by network camera 10C.

Since the monitoring system according to Embodiment 3 can control a synchronization gap similarly to the system according to Embodiment 1, even if the UDP communication is applied to image communication requiring the real-time communication, the image communication can be performed smoothly while the security is being maintained.

According to this embodiment, the network camera is used as one example of the transmitter, but any apparatus may be used as long as it has the communication function. For example, a PC, a server, a router, a mobile terminal, such as a notebook PC or a mobile phone, can be used. According to this embodiment, the PC is used as one example of the receiver, but any device may be used as long as it has the communication function. For example, a network camera, a server, a router, a mobile terminal, such as a notebook PC or a mobile phone, can be used.

Embodiment 4

Figure 16:
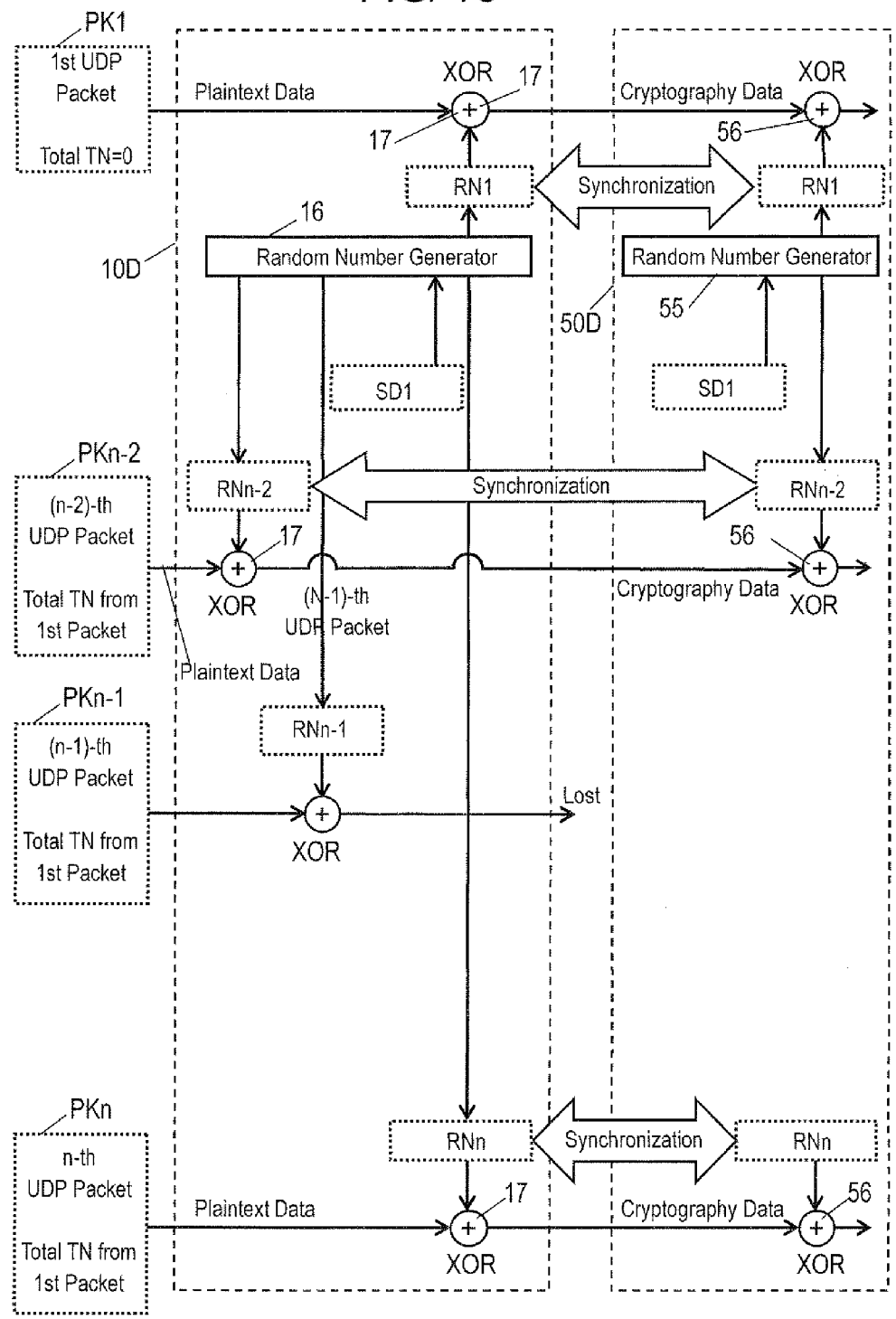
FIG. 16 is a timing chart illustrating an operation of a communication system according to Exemplary Embodiment 4 of the invention.

FIG. 16 is a block diagram of a system modified from a system utilizing the streaming encryption to be used with the UDP communication according to Embodiment 4. The system according to Embodiment 4 is similar to the system according to Embodiment 2 in that the synchronization gap is repressed by the number of communication data, but does not include encrypting sections 12 and 52 for creating a seed.

Encrypting and decrypting sections shown in FIG. 16 have a feature that transmitter 10D describes, in packets PKn-1 and PKn, information about the number of communication data transmitted prior to packets PKn-1 and PKn. Transmitter 10D describes the information about the number of communication data into the data section of the UDP packet, and receiver 50D reads the information.

Receiver 50D obtains the number of communication data so as to obtain the data size of communication data transmitted by transmitter 10D before each UDP packet (UDP data section) is transmitted. The system generates pseudorandom numbers the number of which is equal to the number of communication data before each UDP packet are decrypted, thereby achieving synchronization even if some UDP packets are lost.

In FIG. 16, receiver 50D obtains the number of communication data transmitted before packet PKn so as to realize whether or not packet PKn-1 is lost or whether or not the order of the packets is reversed. In order to decrypt packet PKn, receiver 50D calculates a difference by subtracting the number of communication data transmitted before packet PKn-2 from the number of communication data transmitted before packet PKn. Receiver 50D instructs random number generator 55 to generate the pseudorandom numbers the number of which is equal to the calculated difference. Since packet PKn-1 might arrive later, the generated pseudorandom numbers are stored in receiver 50D, and are used when packet PKn-1 arrives.

As a result, the pseudorandom numbers to be used for the packets PKn are the same as pseudorandom numbers RNn utilized by transmitter 10D for encryption, and achieve the synchronization, thereby performing a proper decryption.

Embodiment 5

Figure 17:
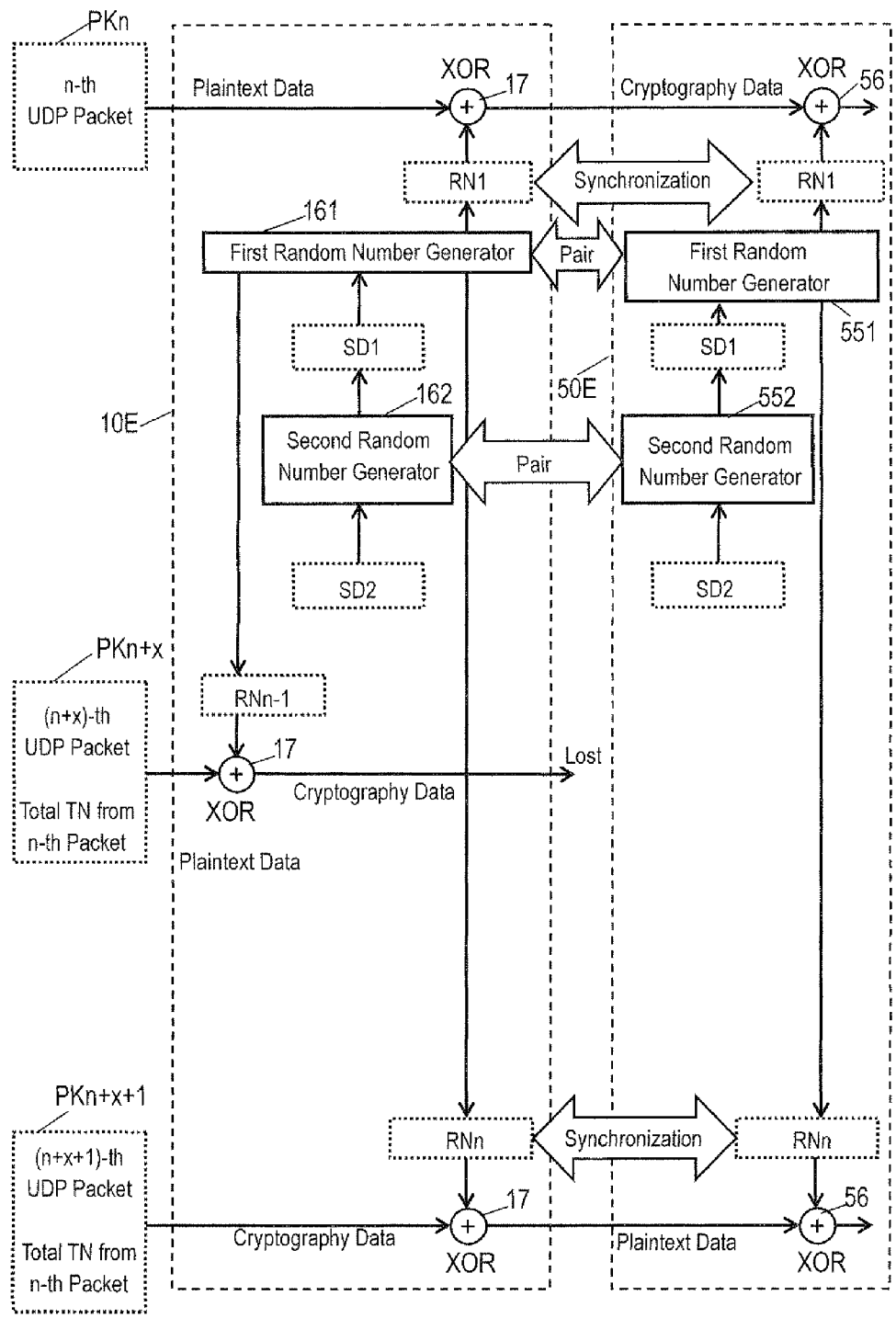
FIG. 17 is a timing chart illustrating an operation of a communication system according to Exemplary Embodiment 5 of the invention.

FIG. 17 is a block diagram of a system modified from the system utilizing the streaming encryption shown in FIG. 2 in order to be used with the UDP communication. The system according to this embodiment further includes second random number generators 162 and 552 added to the system according to Embodiment 4. First random number generators 161 and 551 are similar to random number generators 16 and 55 according to Embodiment 4.

The encrypting and decrypting system shown in FIG. 17 has a feature that seed SD1 is not exchanged between transmitter 10E and receiver 50E, and seeds SD1 are generated by second random number generators 162 and 552. Therefore, a seed SD2 is exchanged and set previously. Differently from the system shown in FIG. 16, the numbers of communication data described in the packets PKn+x and PKn+x+1 are not the number of communication data starting from the first packet, but the number of communication data starting from packet PKn. That is, the numbers of communication data described in the packets PKn+x and PKn+x+1 are the totals of data sizes of communication data transmitted by transmitter 10E until packet PKn+x and packet PKn+x+1 are received from transmitting packet PKn, respectively. This operation reduces the number of communication data, accordingly increasing the transmission speed if packets are lost.

Second random number generators 162 and 552 generate seeds (pseudorandom numbers) every time when the counter data steps by N, such as "N, 2N, 3N, . . . ". Receiver 50E can reads the counter data from the UDP packet. In order to enable receiver 50E to read the counter data from the UDP packet, transmitter 10E adds the counter data to the UDP packet or reads the counter data from each header of the UDP packet.

This system reduces a time for generating the random numbers even if an improper UDP packet with fairly former counter data or a UDP packet with the number of fairly former communication data is transmitted, as long as the number N is large. Practically, receiver 50E instructs second random number generator 552 to generate pseudorandom numbers the number of which is equal to a quotient obtained by dividing the counter data by the number N, and sets the last number of the generated pseudorandom numbers as seed SD1 to first random number generator 551. Receiver 50E instructs first random number generator 551 to generate pseudorandom numbers the number of which is equal to a remainder obtained by dividing the counter data by the number N, hence reducing the time for generating pseudorandom numbers.

Two stages of random number generators are provided, but three or more stages of generators can be provided so that the method for generating pseudorandom numbers, accordingly providing the system with high efficiency.

When an improper UDP packet shown in FIG. 16 is transmitted, unused pseudorandom numbers are included in the pseudorandom numbers generated by second random number generator 162. These unused random numbers prevent a proper UDP packet transmitted by transmitter 10E from being decrypted. However, a size of data to be stored cannot be estimated, thus raising a problem.

Therefore, when second random number generator 552 generates seed SD1, internal information in second random number generator 552 may be stored in receiver 50E. It is determined, by utilizing the MAC, whether the UDP packet is proper or not. If the UDP packet is determined to be improper, the internal information in second random number generator 552 stored in receiver 50E may be returned to second random number generator 552.

This application is based upon and claims the benefit of priority of Japanese Patent Application No. 2009-276294 filed on Dec. 4, 2009, the contents of which are incorporated herein by reference in its entirety.

INDUSTRIAL APPLICABILITY

A decrypting apparatus according to the present invention prevents a synchronization gap with an encrypting apparatus even when packet loss and a change in an order of the packets occur during the transmission of the packets. The decrypting apparatus is useful to a communication system requiring security and smooth communication.

REFERENCE SIGNS LIST

11 Communication Data Generator
12 Encrypting Section
13 Key Exchanging Section
15 CTR Memory
16 Random Number Generator
17 XOR Processor 19 Data, Combining Section
20 Counter-Up Section
21 UDP Data Transmitter/Receiver
22 Network Controller

The invention claimed is:

1. A decrypting apparatus for decrypting cryptography data included in a packet, comprising:
   a receiver for receiving a plurality of packets transmitted from an encrypting apparatus that executes an encrypting process on the packets;
   a key generator for generating a key for decrypting one of the packets, the key being the same as a key used for the encrypting process to encrypt the one packet; and
   a decrypting section for decrypting cryptography data included in the one packet received by the receiver with using the key generated by the key generator, wherein
   the one packet received by the receiver includes packet information to be used by the key generator for generating the key, the packet information being information for uniquely identifying the one packet relative to the others of the plurality of packets, and
   the key generator encrypts the packet information and uses the encrypted packet information in generating the key, the decrypting apparatus further comprising:
   a random number generator for generating random numbers with using the key generated by the key generator as a seed, wherein the decrypting section performs an XOR operation on the random numbers generated by the random number generator and the cryptography data included in the one packet, wherein:
   the encrypting apparatus transmits a first packet, . . . , an (M−1)-th packet, an M-th packet, . . . , and an N-th packet (1<M<N, N≥2) to the decrypting apparatus, the decrypting apparatus further comprising a random sequence setting section for setting a random sequence based on the random numbers generated by the random number generator according to a total of a number of communication data from the first packet to the (M−1)-th packet, and
   the decrypting section performs the XOR operation on the random sequence set by the random sequence setting section and the cryptography data included in the N-th racket.

2. The decrypting apparatus according to claim 1, wherein the key generator generates the seed for every at least two or more packets.

3. The decrypting apparatus according to claim 1, wherein the M-th packet includes information indicating a total of the numbers of communication data in from the first packet to the (M−1)-th packet, and
   the random sequence setting section sets the random sequence with using the information included in the M-th packet.

4. The decrypting apparatus according to claim 1, wherein the key generator generates the key by encrypting the packet information by a cryptosystem having an inverse function.

5. The decrypting apparatus according to claim 4, wherein the key generator generates the key by encrypting the packet information for each block.

6. The decrypting apparatus according to claim 1, wherein the packet information is counter data that can identify the one packet.

7. The decrypting apparatus according to claim 6, wherein the counter data is a serial number of the one packet.

8. The decrypting apparatus according to claim 1, wherein the one packet is based on a connectionless type protocol.

9. The decrypting apparatus according to claim 8, wherein the connectionless type protocol includes a User Datagram Protocol (UDP).

10. An encrypting apparatus for encrypting plaintext data and transmitting a plurality of packets each including cryptography data to a decrypting apparatus, comprising:
    a key generator for generating a key for encrypting one of the packets with using packet information that uniquely identifies the one packet relative to the others of the plurality of packets, the key generator encrypting the packet information and using the encrypted packet information in generating the key;
    an encrypting section for encrypting plaintext data of the one packet with using the key generated by the key generator to generate cryptography data; and
    a transmitter for transmitting the one packet including the cryptography data and the packet information to the decrypting apparatus, the encrypting apparatus further comprising:
    a random number generator for generating random numbers with using the key generated by the key generator as a seed, wherein the encrypting section performs an XOR operation on the random numbers generated by the random number generator and the cryptography data included in the one packet, and wherein:
    the transmitter sequentially transmits a first packet, . . . , an M-th packet, . . . , and an N-th packet (1≤M<N, N is an integer not greater than 2) to the decrypting apparatus, the M-th packet includes information indicating a total of numbers of communication data from the first packet to the (M−1)-th packet.

11. The encrypting apparatus according to claim 10, wherein the key generator generates the seed for at least every one or more packets.

12. The encrypting apparatus according to claim 10, wherein the key generator generates the key by encrypting the packet information by a cryptosystem having an inverse function.

13. The encrypting apparatus according to claim 12, wherein the key generator generates the key by encrypting the packet information for each block.

14. The encrypting apparatus according to claim 10, wherein the packet information is counter data that can identify the one packet.

15. The encrypting apparatus according to claim 14, wherein the counter data is a serial number of the one packet.

16. The encrypting apparatus according to claim 10, wherein the one packet is based on a connectionless type protocol.

17. The encrypting apparatus according to claim 16, wherein the connectionless type protocol includes a User Datagram Protocol (UDP).

18. A method for decrypting cryptography data included in a packet, said method comprising:
    receiving a plurality of packets transmitted from an encrypting apparatus that executes an encrypting process on the packets;
    generating a key for decrypting one of the packets, the key being the same as a key used for the encrypting process to encrypt the one packet; and
    decrypting cryptography data included in the one packet received at the receiving step based on the key generated at the key generating step, wherein
    the one packet received in said receiving includes packet information to be used in the key generating step for generating the key, the packet information being information for uniquely identifying the one packet relative to the others of the plurality of packets, and said generating of the key comprises encrypting the packet information and using the encrypted packet information in generating the key, the method further comprising:

generating random numbers with using the key as a seed, wherein the decrypting includes performing an XOR operation on the random numbers and the cryptography data included in the one packet, transmitting a first packet, . . . , an (M−1)-th packet, an M-th packet, . . . , and an N-th packet (1<M<N, N≥2), setting a random sequence based on the random numbers according to a total of a number of communication data from the first packet to the (M−1)-th packet, and performing the XOR operation on the random sequence and the cryptography data included in the N-th packet.

19. A method for encrypting plaintext data and transmitting a plurality of packets each including cryptography data to a decrypting apparatus, said method comprising:

generating a key for encrypting one of the packets with using packet information that uniquely identifies the one packet relative to the others of the plurality of packets, said generating including encrypting the packet information and using the encrypted packet information in generating the key;

generating cryptography data by encrypting plaintext data of the one packet with using the key generated in said generating of the key; and transmitting a packet including the cryptography data and the packet information to the decrypting apparatus, the method further comprising:

generating random numbers with using the key as a seed, performing an XOR operation on the random numbers and the cryptography data included in the one packet, and sequentially transmitting a first packet, . . . , an M-th packet, . . . , and an N-th packet (1≤M<N, N is an integer not greater than 2), the M-th packet including information indicating a total of numbers of communication data from the first packet to the (M−1)-th packet.

20. A communication system comprising:

an encrypting apparatus for encrypting plaintext data of a plurality of packets to generate cryptography data for each of the packets and transmitting one of the plurality of packets including its said cryptography data to a communication line; and a decrypting apparatus for receiving the one packet from the encrypting apparatus via a communication line and decrypting the cryptography data included in the one packet, wherein the encrypting apparatus includes a first key generator for generating a key for encrypting the one of the packets with using packet information that uniquely identifies the one packet relative to the others of the plurality of packets, wherein the key generator encrypts the packet information and uses the encrypted packet information in generating the key, an encrypting section for generating the cryptography data by encrypting the plaintext data of the one packet based on the key generated by the first key generator, and a transmitter for transmitting the one packet including the cryptography data and the packet information to the decrypting apparatus, the decrypting apparatus further comprising:

a random number generator for generating random numbers with using the key generated by the key generator as a seed, wherein the decrypting section performs an XOR operation on the random numbers generated by the random number generator and the cryptography data included in the one packet, wherein:

the encrypting apparatus transmits a first packet, . . . , an (M−1)-th packet, an M-th packet, . . . , and an N-th packet (1<M<N, N≥2) to the decrypting apparatus, the decrypting apparatus further comprising a random sequence setting section for setting a random sequence based on the random numbers generated by the random number generator according to a total of a number of communication data from the first packet to the (M−1)-th packet, and the decrypting section performs the XOR operation on the random sequence set by the random sequence setting section and the cryptography data included in the N-th packet, the decrypting apparatus includes a receiver for receiving the one packet transmitted from the encrypting apparatus, a second key generator that encrypts the packet information and uses the encrypted packet information in generating the key, the key generated by the second key generator being the same as the key generated by the first key generator; and a decrypting section for decrypting the cryptography data included in the one packet received by the receiver based on the key generated by the second key generator.

21. The communication system according to claim 20, wherein:

the encrypting apparatus further comprises:

a random number generator for generating random numbers with using the key generated by the key generator as a seed, wherein the encrypting section performs an XOR operation on the random numbers generated by the random number generator and the cryptography data included in the one packet, and wherein:

the transmitter sequentially transmits a first packet, . . . , an M-th packet, . . . , and an N-th packet (1≤M<N, N is an integer not greater than 2) to the decrypting apparatus, the M-th packet includes information indicating a total of numbers of communication data from the first packet to the (M−1)-th packet.

* * * * *